United States Patent
Yamada et al.

(10) Patent No.: US 10,386,955 B2
(45) Date of Patent: Aug. 20, 2019

(54) DISPLAY DEVICE WITH CAPACITIVE TOUCH DETECTION

(71) Applicant: Japan Display Inc., Tokyo (JP)

(72) Inventors: Teppei Yamada, Tokyo (JP); Masaki Murase, Tokyo (JP); Yoshiyuki Ikehata, Tokyo (JP); Daisuke Ito, Tokyo (JP); Naoki Takada, Tokyo (JP)

(73) Assignee: Japan Display Inc., Tokyo (JP)

( * ) Notice: Subject to any disclaimer, the term of this patent is extended or adjusted under 35 U.S.C. 154(b) by 90 days.

(21) Appl. No.: 15/373,201

(22) Filed: Dec. 8, 2016

(65) Prior Publication Data

US 2017/0168640 A1    Jun. 15, 2017

(30) Foreign Application Priority Data

Dec. 14, 2015 (JP) .................. 2015-243134

(51) Int. Cl.
*G06F 3/041* (2006.01)
*G06F 3/044* (2006.01)
(Continued)

(52) U.S. Cl.
CPC ........ *G06F 3/0416* (2013.01); *G02F 1/13306* (2013.01); *G02F 1/13338* (2013.01);
(Continued)

(58) Field of Classification Search
CPC ...... G06F 3/0416; G06F 3/044; G06F 3/0412; G06F 2203/04107; G09G 3/20; G02F 1/13306; G02F 1/13338; G02F 1/136286
See application file for complete search history.

(56) References Cited

U.S. PATENT DOCUMENTS 8,878,768 B2   11/2014   Nagata et al.
9,357,045 B2   5/2016    Oishi et al.
(Continued)

FOREIGN PATENT DOCUMENTS

JP   2013-196326 A   9/2013
JP   2013-222421 A   10/2013
(Continued)

OTHER PUBLICATIONS

Japanese Office Action dated May 7, 2019 for the corresponding Japanese Patent Application Na 2015-243134, with machine translation.

*Primary Examiner* — Jonathan A Boyd
(74) *Attorney, Agent, or Firm* — Michael Best & Friedrich LLP

(57) ABSTRACT

A liquid crystal display device includes a panel unit and a driving unit driving the panel unit. The driving unit includes as operation modes a first mode in which a detection operation of a first external object is performed in units of a divided region obtained by dividing an entire surface of a touch region of the panel unit and a second mode in which a detection operation of a second external object is performed on the entire surface of the touch region of the panel unit. The first mode is a mode detecting, in units of the divided region of the panel unit, a contact position of the first external object with each divided region, and the second mode is a mode detecting, on the entire surface of the panel unit, whether or not the second external object approaches the entire surface.

15 Claims, 14 Drawing Sheets

(51) Int. Cl.
  *G02F 1/1333*  (2006.01)
  *G02F 1/1362*  (2006.01)
  *G02F 1/133*   (2006.01)
  *G09G 3/20*    (2006.01)

(52) U.S. Cl.
  CPC ........ *G02F 1/136286* (2013.01); *G06F 3/044* (2013.01); *G06F 3/0412* (2013.01); *G09G 3/20* (2013.01); *G06F 2203/04107* (2013.01)

(56) References Cited

U.S. PATENT DOCUMENTS

| | | |
|---|---|---|
| 9,785,283 B2 | 10/2017 | Noguchi et al. |
| 9,838,527 B2 | 12/2017 | Oishi et al. |
| 2011/0109577 A1* | 5/2011 | Lee .................. G06F 3/044 345/173 |
| 2013/0278516 A1* | 10/2013 | Nagata ............... G06F 3/041 345/173 |
| 2015/0103038 A1* | 4/2015 | Han .................. G06F 3/044 345/174 |
| 2015/0205412 A1* | 7/2015 | Kim .................. G06F 3/044 345/174 |
| 2017/0017336 A1 | 1/2017 | Mayumi |
| 2017/0336917 A1 | 11/2017 | Noguchi et al. |

FOREIGN PATENT DOCUMENTS

| | | |
|---|---|---|
| JP | 2015-164033 A | 9/2015 |
| WO | 2015/166687 A1 | 11/2015 |

\* cited by examiner

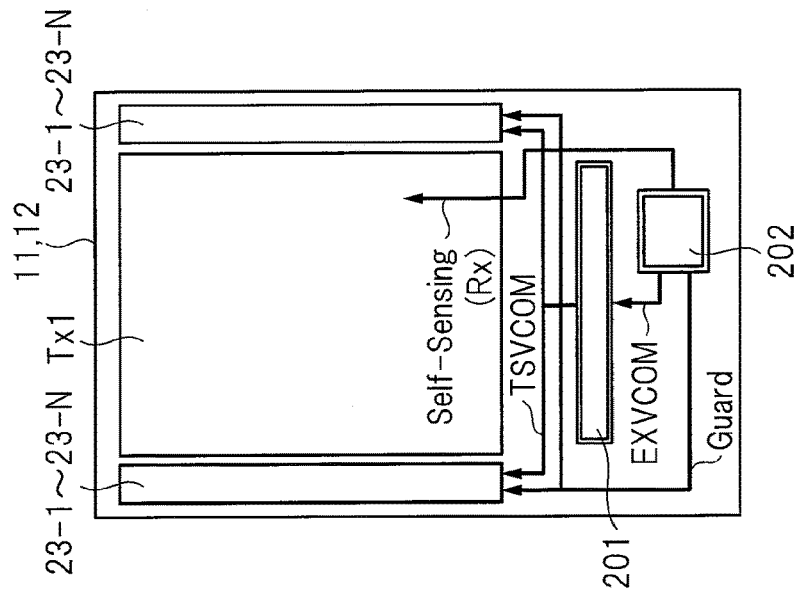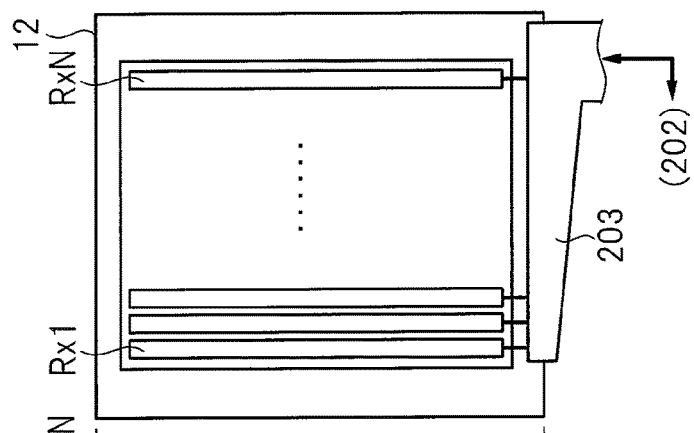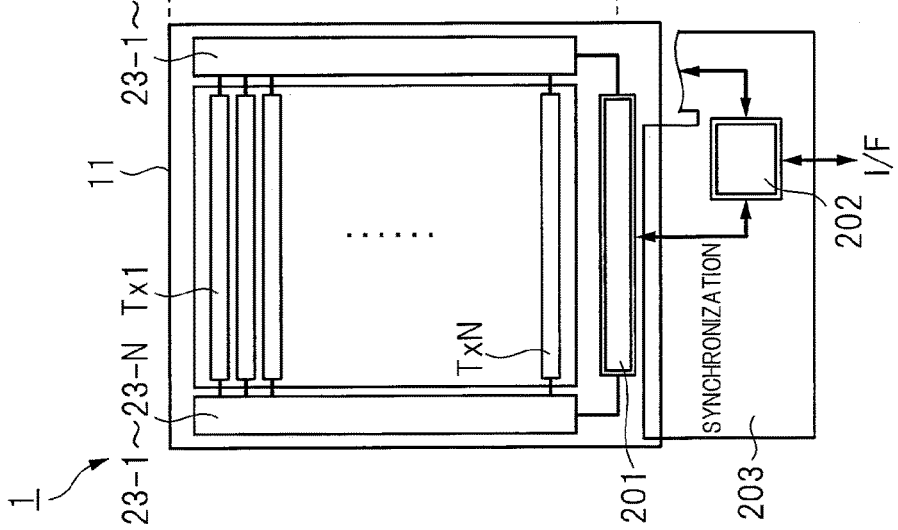

DISPLAY DEVICE WITH CAPACITIVE TOUCH DETECTION

CROSS-REFERENCE TO RELATED APPLICATION

The present application claims priority from Japanese Patent Application No. 2015-243134 filed on Dec. 14, 2015, the content of which is hereby incorporated by reference into this application.

TECHNICAL FIELD OF THE INVENTION

The present invention relates to a display device and more specifically relates to a technique that is effectively applied to a liquid crystal display device with a touch detection function which can detect a contact position of an external object and whether or not the external object approaches based on changes in capacitance.

BACKGROUND OF THE INVENTION

In recent years, a display device including a touch panel in which a display screen is touched by a finger of a user, a pen, or the like to input information has been used for mobile electronic equipment such as a mobile phone and a smartphone. Known examples of such a touch panel are a resistive touch panel in which changes of a resistance value at a touched part are detected, a capacitive touch panel in which changes in capacitance are detected, and an optical sensor touch panel in which changes of the amount of light are detected.

The capacitive touch panel is provided with driving electrodes for application of driving signals and detection electrodes intersecting with the driving electrodes and for detection of the signals. The driving signals are input to the driving electrodes while the driving electrodes are sequentially scanned, and capacitance between each driving electrode and each detection electrode is detected by a touch detection unit. In a case where an external object such as a finger contacts a surface of the touch panel, capacitance of each detection electrode changes. The touch detection unit detects the changed capacitance, and input coordinates are calculated based on a signal of the capacitance change detected in each detection electrode. For example, Japanese Patent Application Laid-Open Publication No. 2013-222421 (referred to as Patent Document 1, hereinafter) describes a liquid crystal display device with a capacitive touch detection function.

SUMMARY OF THE INVENTION

In the aforementioned liquid crystal display device with a capacitive touch detection function, coordinates can be detected with use of changes in capacitance between each driving electrode and each detection electrode caused by contact of an external object such as a finger of a user. This method for detecting the coordinates is referred to as a mutual detection method.

Also, in the liquid crystal display device with a touch detection function, it is required in some cases that whether or not an external object such as a finger of a user approaches is detected with use of changes in ground capacitance of the detection electrode caused by the approach of the external object. This method for detecting whether or not the external object approaches is referred to as a self-detection method.

To achieve this self-detection method, a circuit supporting a driving method, which differs from the scanning method of the driving electrodes in the mutual detection method, is required. In this case, to support the mutual detection method and the self-detection method, a driving circuit for driving the liquid crystal display panel needs to be devised. In Patent Document 1 described above, although the mutual detection method and the self-detection method can be achieved, a driving circuit for achieving the methods has not been considered.

An object of the present invention is to provide a display device capable of achieving a driving circuit for supporting a mutual detection method and a self-detection method.

A display device according to an aspect of the present invention includes a panel unit, and a driving unit driving the panel unit, and the driving unit includes, as operation modes, a first mode in which a detection operation of an external object is performed in units of a divided region obtained by dividing a first touch region of the panel unit, and a second mode in which a detection operation of an external object is performed on an entire surface of the first touch region of the panel unit.

Also, as another aspect of the present invention, the first mode may be set as a mode detecting, in units of the divided region of the first touch region, a contact position of the external object with each divided region, and the second mode may be set as a mode detecting, on the entire surface of the first touch region, whether or not the external object approaches the entire surface.

BRIEF DESCRIPTIONS OF THE DRAWINGS

FIG. 5A illustrates an example of a schematic configuration of a module on which the liquid crystal display device with a touch detection function according to the embodiment is implemented;

FIG. 5B illustrates an example of a schematic configuration of the module on which the liquid crystal display device with a touch detection function according to the embodiment is implemented;

FIG. 5C illustrates an example of a schematic configuration of the module on which the liquid crystal display device with a touch detection function according to the embodiment is implemented;

DESCRIPTIONS OF THE PREFERRED EMBODIMENTS

Figure 1:
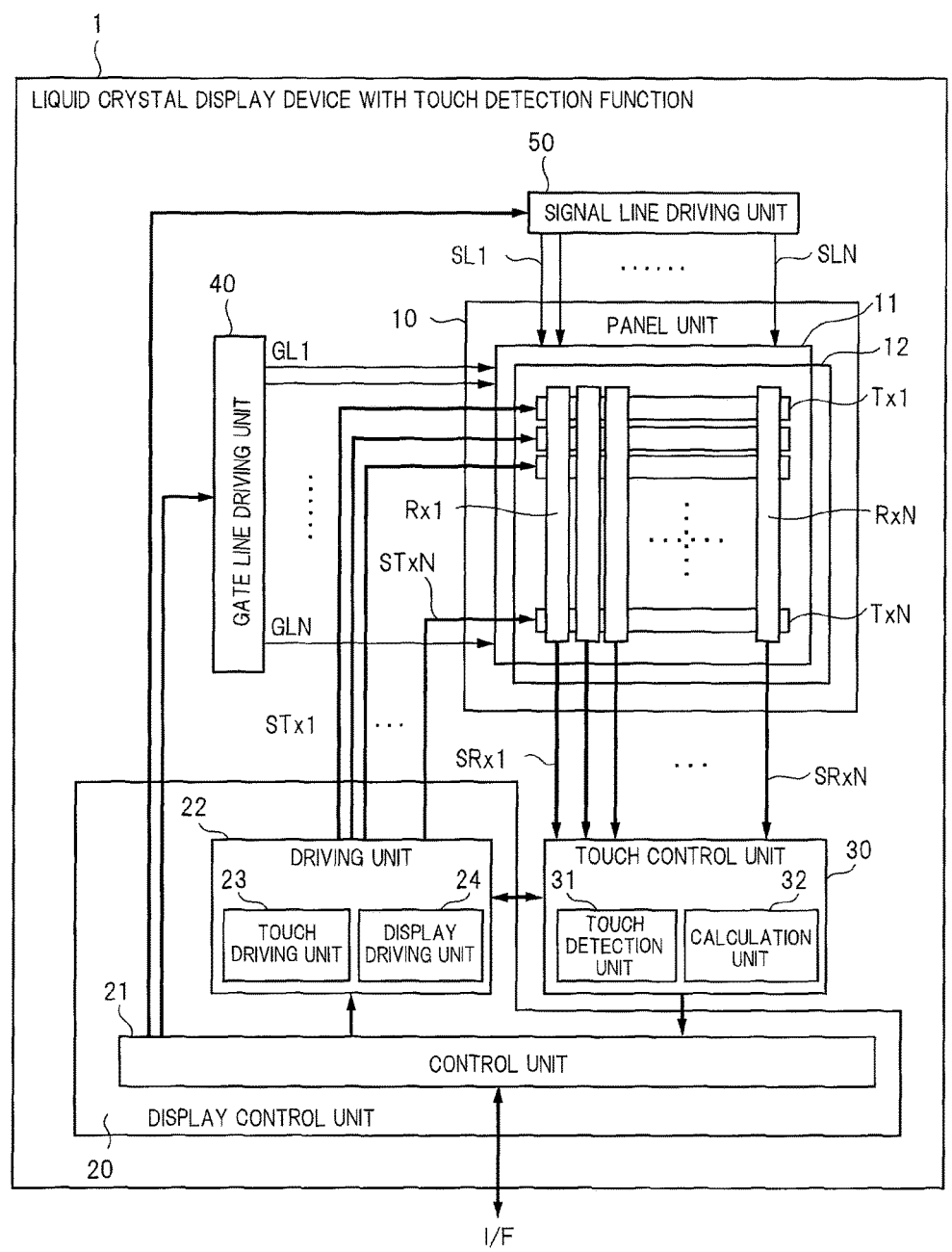
FIG. 1 is a block diagram illustrating an example of a schematic configuration of a liquid crystal display device with a touch detection function according to an embodiment.

Hereinafter, each embodiment of the present invention will be described with reference to the drawings. Note that this disclosure is an example only and suitable modifications which can be easily conceived by those skilled in the art without departing from the gist of the present invention are included within the scope of the invention as a matter of course. In addition, in order to further clarify the description, a width, a thickness, a shape, and the like of respective portions may be schematically illustrated in the drawings as compared to aspects of the embodiments, but they are examples only and do not limit the interpretation of the present invention.

In addition, in this specification and the respective drawings, the same components described in the drawings which have been described before are denoted by the same reference characters, and detailed description thereof may be omitted as needed.

(Embodiment)

A liquid crystal display device with a touch detection function according to the present embodiment is used for mobile electronic equipment such as a mobile phone and a smartphone although usage thereof is not limited to them.

<Liquid Crystal Display Device with Touch Detection Function>

First, a configuration of a liquid crystal display device with a touch detection function according to the present embodiment will be described with reference to FIG. 1. FIG. 1 is a block diagram illustrating an example of a schematic configuration of the liquid crystal display device with a touch detection function according to the present embodiment.

A liquid crystal display device with a touch detection function 1 includes a panel unit 10, a display control unit 20, a touch control unit 30, a gate line driving unit 40, and a signal line driving unit 50. The panel unit 10 includes a display panel unit 11 and a touch detection panel unit 12. The display control unit 20 includes a control unit 21 and a driving unit 22. The driving unit 22 includes a touch driving unit 23 and a display driving unit 24. The touch control unit 30 includes a touch detection unit 31 and a calculation unit 32. In the configuration of the liquid crystal display device with a touch detection function 1, the display control unit 20, the touch control unit 30, the gate line driving unit 40, and the signal line driving unit 50 are circuit parts.

The panel unit 10 is schematically illustrated in FIG. 1 so as to make the drawing easy to see and includes the display panel unit 11 and the touch detection panel unit 12. Although a configuration of this panel unit 10 will be described below with reference to FIG. 2 and the like, the panel unit 10 includes a TFT substrate, a color filter substrate, and the like and is provided with a plurality of driving electrodes Tx1 to TxN for application of driving signals and a plurality of detection electrodes Rx1 to RxN intersecting with the respective driving electrodes Tx1 to TxN for detection of the signals.

The control unit 21 controls the entirety of the liquid crystal display device with a touch detection function 1 and has a configuration in which a control unit for a touch detection function and a control unit for a display function are integrated in this example. The control unit 21 controls the touch detection function and the display function in synchronization. The control unit 21 cooperates with electronic equipment connected thereto via an interface I/F and controls the touch detection function and the display function based on an instruction from the electronic equipment.

The control unit 21 gives a control signal for touch driving to the driving unit 22 and receives touch detection information from the touch control unit 30. The control unit 21 also gives a driving control signal to the gate line driving unit 40, the signal line driving unit 50, and the like based on an image signal, a timing signal, and control instruction information from the electronic equipment or the like connected via the interface I/F. The control unit 21 also transmits the touch detection information as a report to the electronic equipment or the like connected via the interface I/F.

The gate line driving unit 40 scans gate lines GL1 to GLN of the display panel unit 11 with use of scanning signals based on a control instruction from the control unit 21. The signal line driving unit 50 supplies data signals to signal lines SL1 to SLN of the display panel unit 11 in synchronization with the scanning of the gate lines GL1 to GLN based on a control instruction from the control unit 21.

The driving unit 22 includes the touch driving unit 23 and the display driving unit 24. The driving unit 22 operates the plurality of driving electrodes Tx1 to TxN of the panel unit 10 while the touch driving unit 23 and the display driving unit 24 are synchronized in a time-division manner based on a control instruction from the control unit 21. The touch driving unit 23 is a circuit unit performing touch driving in the touch detection function. The touch driving unit 23 operates the driving electrodes Tx1 to TxN to perform the touch driving during a touch detection period. This touch driving includes driving in a mutual detection method in which driving signals STx1 to STxN are applied to the driving electrodes Tx1 to TxN while all of the driving electrodes Tx1 to TxN are sequentially scanned, and driving in a self-detection method in which the driving signals STx1 to STxN are simultaneously applied to all of the driving electrodes Tx1 to TxN. The display driving unit 24 is a circuit unit performing display driving in the liquid crystal display function. The display driving unit 24 operates the driving electrodes Tx1 to TxN to perform the display driving during a display period.

The touch control unit 30 includes the touch detection unit 31 and the calculation unit 32. The touch control unit 30 detects in the touch detection unit 31 touch detection signals SRx1 to SRxN from the plurality of detection electrodes Rx1 to RxN of the panel unit 10 as inputs at the time of the touch driving performed by the driving unit 22. The touch control unit 30 then performs, in the calculation unit 32, calculation of a position coordinate of contact with the panel unit 10, determination of whether or not an external object approaches the panel unit 10, or the like with use of the touch detection signals SRx1 to SRxN to obtain touch detection information and outputs the touch detection information as a report.

The touch detection unit 31 includes an amplifier, a rectifier, an analog/digital converter, and the like. For example, the touch detection unit 31 amplifies, rectifies, and A/D-converts signals from the detection electrodes Rx1 to RxN as inputs, and obtains the signals as the touch detection signals SRx1 to SRxN. The calculation unit 32 calculates a detailed touched coordinate position of the panel unit 10 or determines whether or not the panel unit 10 is touched with use of the plurality of touch detection signals SRx1 to SRxN obtained by the touch detection unit 31 and obtains the result as the touch detection information.

<Mutual Detection Method and Self-Detection Method>

Figure 2A:
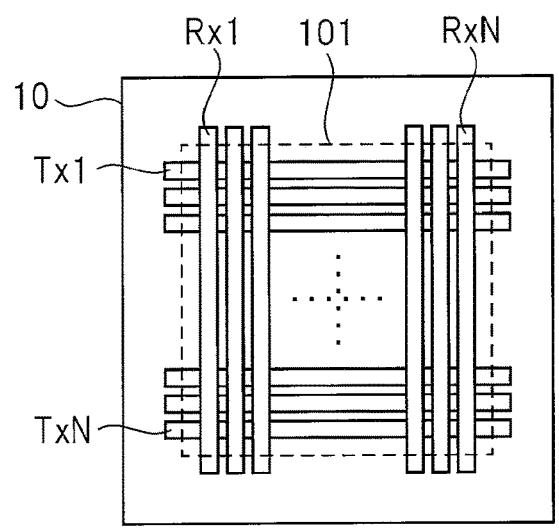
FIG. 2A illustrates a mutual detection method and a self-detection method in the liquid crystal display device with a touch detection function according to the embodiment.
Figure 2B:
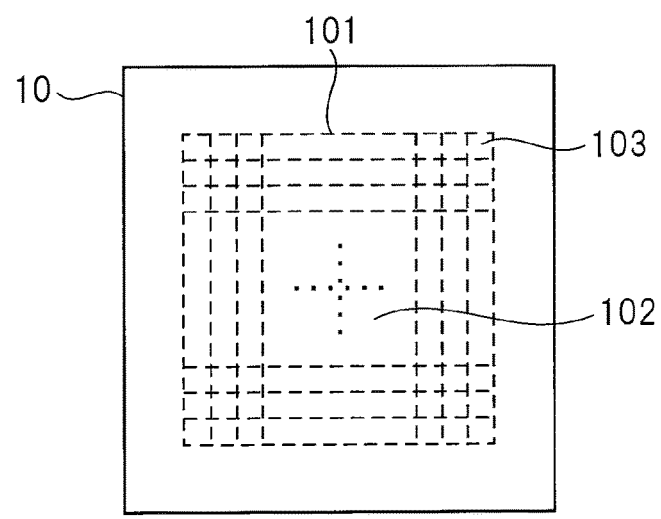
FIG. 2B illustrates a mutual detection method and a self-detection method in the liquid crystal display device with a touch detection function according to the embodiment.
Figure 2C:
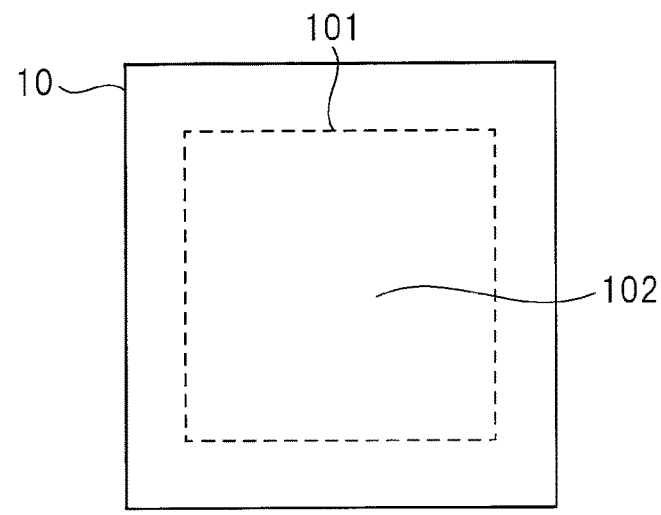
FIG. 2C illustrates a mutual detection method and a self-detection method in the liquid crystal display device with a touch detection function according to the embodiment.

FIGS. 2A to 2C illustrate a mutual detection method and a self-detection method in the liquid crystal display device with a touch detection function 1 according to the present embodiment. FIG. 2A illustrates an example of an arrangement of the driving electrodes Tx1 to TxN and the detection electrodes Rx1 to RxN, FIG. 2B illustrates an example of a detection region in the mutual detection method, and FIG. 2C illustrates an example of a detection region in the self-detection method.

As illustrated in FIG. 2A, the panel unit 10 illustrated in FIG. 1 includes the plurality of driving electrodes Tx1 to TxN for application of driving signals and the plurality of detection electrodes Rx1 to RxN intersecting with the respective driving electrodes Tx1 to TxN for detection of the signals. The plurality of driving electrodes Tx1 to TxN and the plurality of detection electrodes Rx1 to RxN are arranged in a matrix form. In FIG. 2A, the plurality of driving electrodes Tx1 to TxN extend along a row direction and are arranged in parallel in a column direction while the plurality of detection electrodes Rx1 to RxN extend along the column direction and are arranged in parallel in the row direction. Here, the number of the driving electrodes Tx is illustrated as N consisting of 1 to N, and the number of the detection electrodes Rx is illustrated as N consisting of 1 to N, for example. However, the number of the electrodes of each kind is not limited to this. The mutual detection method is a method in which coordinates are detected with high accuracy with use of changes in capacitance between each of the driving electrodes Tx1 to TxN and each of the detection electrodes Rx1 to RxN caused by contact of an external object such as a finger of a user. This mutual detection method can also be referred to as a mutual capacitance method since changes in capacitance between each of the driving electrodes Tx1 to TxN and each of the detection electrodes Rx1 to RxN are detected.

In an operation mode (first mode) achieving the mutual detection method, a detection operation of an external object which is a target for detection is performed in units of a divided region 103 obtained by dividing an entire surface 102 of a touch region 101 of the panel unit 10 as illustrated in FIG. 2B. Specifically, this operation mode is a mode in which, in units of the divided region 103 corresponding to an intersection region between each of the driving electrodes Tx1 to TxN and each of the detection electrodes Rx1 to RxN arranged on the panel unit 10 in a matrix form, a contact position of the external object with each divided region 103 is detected.

In this operation mode of the mutual detection method, a pen or the like as well as a finger of a user is a target for detection.

The self-detection method is a method in which whether or not an external object such as a finger of a user approaches is detected with use of changes in ground capacitance of each of the detection electrodes Rx1 to RxN caused by the approach of the external object although no coordinate information is provided. This self-detection method can also be referred to as a self-capacitance method since changes in ground capacitance of each of the detection electrodes Rx1 to RxN are detected.

In an operation mode (second mode) achieving the self-detection method, a detection operation of an external object which is a target for detection is performed on the entire surface 102 of the touch region 101 of the panel unit 10 as illustrated in FIG. 2C. Specifically, this operation mode is a mode in which, on the entire surface 102, not in units of the intersection region between each of the driving electrodes Tx1 to TxN and each of the detection electrodes Rx1 to RxN arranged on the panel unit 10 in a matrix form, whether or not the external object approaches the entire surface 102 is detected.

In this operation mode of the self-detection method, a target for detection is not limited to a finger of a user, a pen, and the like but may be an object of different kind from the target object in the mutual detection method. For example, a mobile phone or a smartphone possessed by another person nearby can be a target for detection.

Note that, in the operation mode achieving the self-detection method, an external object can also be detected not only on the entire surface 102 of the touch region 101 of the panel unit 10, but also on each region obtained by dividing the entire surface 102 of the touch region 101 into right and left regions or upper and lower regions. For example, in a case where detection is performed by dividing the entire surface 102 of the touch region 101 into right and left regions, detection can easily be achieved by dividing the detection electrodes Rx1 to RxN into those on the right side and those on the left side since the detection electrodes Rx1 to RxN are arranged in parallel in the right-left direction.

<Basic Principle of Mutual Detection Method>

Figure 3A:
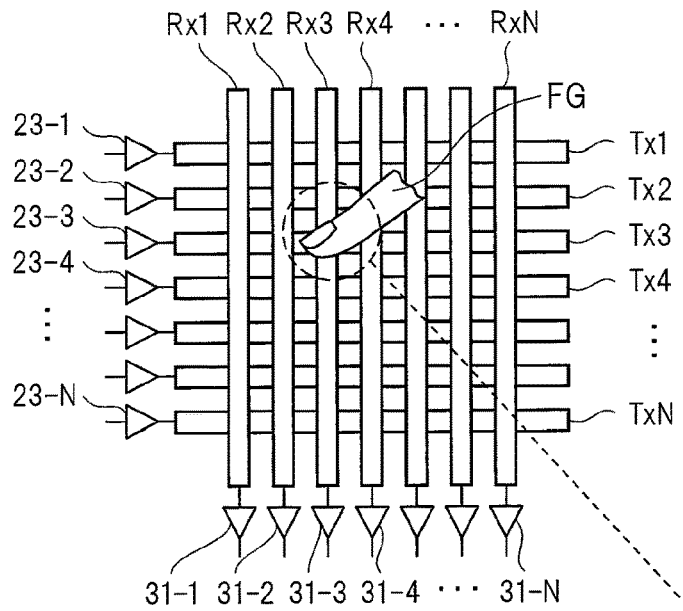
FIG. 3A illustrates a basic principle of the mutual detection method using the liquid crystal display device with a touch detection function according to the embodiment.
Figure 3B:
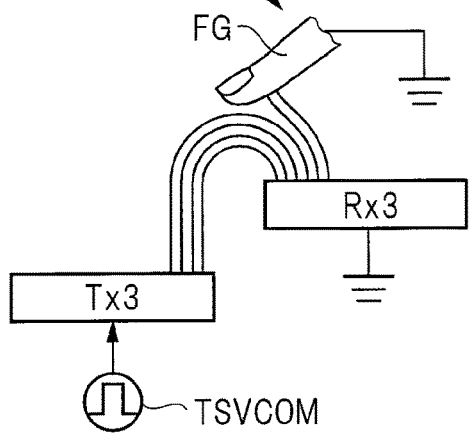
FIG. 3B illustrates a basic principle of the mutual detection method using the liquid crystal display device with a touch detection function according to the embodiment.
Figure 3C:
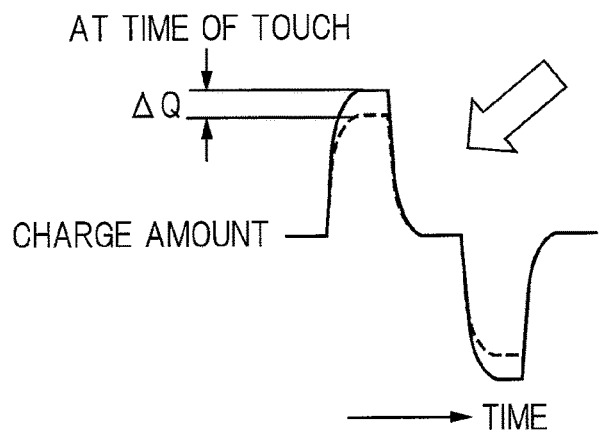
FIG. 3C illustrates a basic principle of the mutual detection method using the liquid crystal display device with a touch detection function according to the embodiment.

FIGS. 3A to 3C illustrate a basic principle of the mutual detection method using the liquid crystal display device with a touch detection function 1 according to the present embodiment. In FIG. 3A, the driving electrodes Tx1 to TxN are provided in the display panel unit 11, and the detection electrodes Rx1 to RxN are provided in the touch detection panel unit 12. In FIG. 3A, the respective driving electrodes Tx1 to TxN extend along the row direction and are arranged in parallel in the column direction. Also, the respective detection electrodes Rx1 to RxN extend along the column direction to intersect with the driving electrodes Tx1 to TxN and are arranged in parallel in the row direction. The detection electrodes Rx1 to RxN are formed above the driving electrodes Tx1 to TxN so as to generate a space between the detection electrodes Rx1 to RxN and the driving electrodes Tx1 to TxN.

In FIG. 3A, driving electrode driving circuits 23-1 to 23-N are provided in the touch driving unit 23. That is, the driving signals STx1 to STxN are supplied from the driving electrode driving circuits 23-1 to 23-N to the driving electrodes Tx1 to TxN. Also, detection circuits 31-1 to 31-N are provided in the touch detection unit 31. In FIG. 3B, a pulse signal circled with a solid line illustrates a waveform of a pulsed mutual detection driving signal TSVCOM in which voltage periodically changes. In FIG. 3B, a finger FG is illustrated as an external object.

To each of the driving electrodes, the driving electrode Tx3 in this example, sequentially designated by the touch driving unit 23, the mutual detection driving signal TSVCOM is supplied as the driving signal STx3 from the driving electrode driving circuit 23-3. At this time, the detection electrode Rx3 intersecting with the driving electrode Tx3 has ground voltage. When the mutual detection driving signal TSVCOM, which is a pulse signal, is supplied to the driving electrode Tx3, an electric field is generated between the driving electrode Tx3 and the detection electrode Rx3 intersecting with the driving electrode Tx3 as illustrated in FIG. 3B. At this time, in a case where the finger FG touches (is in contact with) a position of the panel unit 10 close to the detection electrode Rx3, an electric field is generated between the finger FG and the detection electrode Rx3 as well, and the electric field generated between the driving electrode Tx3 and the detection electrode Rx3 decreases. As a result, the charge amount between the driving electrode Tx3 and the detection electrode Rx3 decreases. Accordingly, as illustrated in FIG. 3C, the charge amount generated in response to supply of the mutual detection driving signal TSVCOM is smaller by ΔQ when the finger FG touches the panel unit 10 than that when the finger FG does not touch it. The difference of the charge amount is reflected in the detection signal SRx3 as a voltage difference. The detection signal SRx3 is supplied to the detection circuit 31-3 in the touch detection unit 31 and is subject to signal processing.

Note that, in FIG. 3C, the horizontal axis represents time and the vertical axis represents the charge amount. Also, in FIG. 3C, the dashed line represents changes in charge amount at the time of the touch. In response to a rise of the mutual detection driving signal TSVCOM, that is, a rise of voltage of the driving signal STx3, the charge amount increases (to the upper side in FIG. 3C). In response to a fall of voltage of the driving signal STx3, the charge amount increases (to the lower side in FIG. 3C). At this time, the increasing charge amount differs depending on whether or not the finger FG touches the panel unit 10. Also, in FIG. 3C, a reset is performed after the charge amount has increased to the upper side and before the charge amount increases to the lower side. Similarly, a reset of the charge amount is performed after the charge amount has increased to the lower side and before the charge amount increases to the upper side. In this manner, the charge amount changes to the upper or lower side based on the reset charge amount.

When the mutual detection driving signal TSVCOM is supplied to the driving electrodes Tx1 to TxN designated by the touch driving unit 23, from the respective detection electrodes Rx1 to RxN intersecting with the designated driving electrodes, the detection signals SRx1 to SRxN having voltage values corresponding to whether or not the finger FG is touching positions close to the respective intersection parts are output. The touch detection unit 31 samples the respective detection signals SRx1 to SRxN at time when the difference ΔQ is generated in the charge amount depending on whether or not the finger FG is touching and converts the detection signals SRx1 to SRxN into digital signals. Then, the calculation unit 32 calculates a detailed touched position coordinate of the panel unit 10 with use of the plurality of touch detection signals SRx1 to SRxN obtained by the touch detection unit 31 and obtains the result as the touch detection information. In this manner, the touched position coordinate of the finger FG can be detected.

<Basic Principle of Self-Detection Method>

Figure 4A:
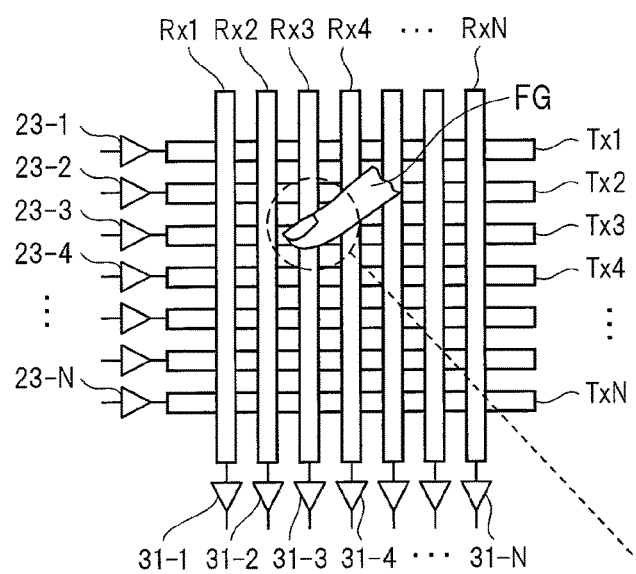
FIG. 4A illustrates a basic principle of the self-detection method using the liquid crystal display device with a touch detection function according to the embodiment.
Figure 4B:
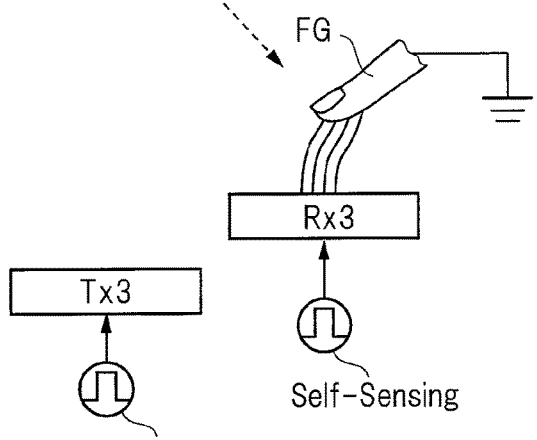
FIG. 4B illustrates a basic principle of the self-detection method using the liquid crystal display device with a touch detection function according to the embodiment.
Figure 4C:
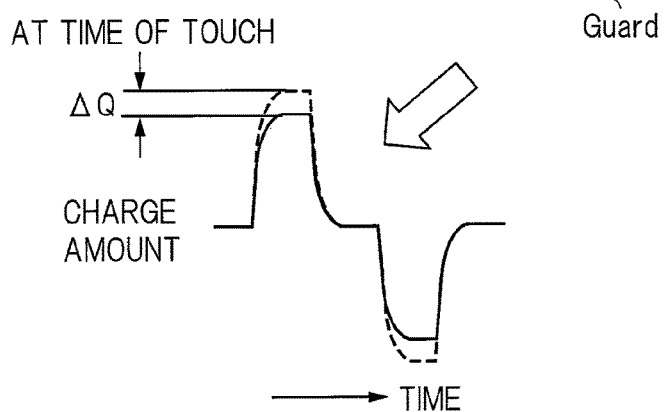
FIG. 4C illustrates a basic principle of the self-detection method using the liquid crystal display device with a touch detection function according to the embodiment.

FIGS. 4A to 4C illustrate a basic principle of the self-detection method using the liquid crystal display device with a touch detection function 1 according to the present embodiment. In FIG. 4A, similarly to FIG. 3A described above, the respective driving electrodes Tx1 to TxN extend along the row direction and are arranged in parallel in the column direction. Also, the respective detection electrodes Rx1 to RxN extend along the column direction to intersect with the driving electrodes Tx1 to TxN and are arranged in parallel in the row direction.

In FIG. 4A, the driving signals STx1 to STxN are supplied from the driving electrode driving circuits 23-1 to 23-N provided in the touch driving unit 23 to the driving electrodes Tx1 to TxN. The detection signals SRx1 to SRxN are supplied from the detection circuits 31-1 to 31-N provided in the touch detection unit 31 to the detection electrodes Rx1 to RxN.

In the self-detection method, to all of the driving electrodes Tx1 to TxN, the driving electrode Tx3 in this example, a self-detection driving signal Guard is supplied as the driving signal STx3 from the driving electrode driving circuit 23-3 by the touch driving unit 23. At this time, to all of the detection electrodes Rx1 to RxN, the detection electrode Rx3 intersecting with the driving electrode Tx3 in this example, a detection signal Self-Sensing having an amplitude and a phase equal to those of the self-detection driving signal Guard is supplied.

In each of the driving electrodes Tx1 to TxN and the detection electrodes Rx1 to RxN, parasitic capacitance exists between ground voltage and each of them. When an external object such as the finger FG approaches the detection electrode Rx3, an electric field is generated between the detection electrode Rx3 and the finger FG as illustrated in FIG. 4B. In other words, when the finger FG approaches, the capacitance connected between the detection electrode Rx3 and the ground voltage increases. Accordingly, when the pulsed self-detection driving signal Guard in which voltage periodically changes, as circled in FIG. 4B, is supplied to the driving electrode Tx3, and the detection signal Self-Sensing having an amplitude and a phase equal to those of the self-detection driving signal Guard is supplied to the detection electrode Rx3, the charge amount accumulated between the detection electrode Rx3 and the ground voltage changes depending on whether or not the finger FG approaches the detection electrode Rx3.

FIG. 4C illustrates changes in charge amount to be accumulated in the detection electrode Rx3 depending on whether or not the finger FG approaches the detection electrode Rx3. In a case where the finger FG approaches the detection electrode Rx3, capacitance connected to the detection electrode Rx3 increases. Accordingly, the charge amount to be accumulated in the detection electrode Rx3 is larger by ΔQ when the finger FG approaches than that when the finger FG does not approach. The difference of the charge amount is reflected in the detection signal SRx3 as a voltage difference. The detection signal SRx3 is supplied to the detection circuit 31-3 in the touch detection unit 31 and is subject to signal processing. In FIG. 4C, the horizontal axis represents time while the vertical axis represents the charge amount. Also, in FIG. 4C, the dashed line represents changes of the charge amount at the time of the approach of the finger FG.

When the self-detection driving signal Guard is supplied to all of the driving electrodes Tx1 to TxN by the touch driving unit 23, and the detection signal Self-Sensing having an amplitude and a phase equal to those of the self-detection driving signal Guard is supplied to all of the detection electrodes Rx1 to RxN, the detection signals SRx1 to SRxN each having a voltage value corresponding to the difference ΔQ of the charge amount accumulated in each of the detection electrodes Rx1 to RxN are output. The touch detection unit 31 detects the difference ΔQ of the charge amount accumulated in each of the detection electrodes Rx1 to RxN to determine whether or not the finger FG approaches any of the detection electrodes Rx1 to RxN. In this manner, whether or not the finger FG approaches can be detected.

<Module>

FIGS. 5A to 5C illustrate an example of a schematic configuration of a module in which the liquid crystal display device with a touch detection function 1 according to the embodiment is implemented. FIGS. 5A and 5B illustrate an implementation configuration example of the liquid crystal display device with a touch detection function 1 corresponding to that in FIG. 1 by dividing the panel unit 10 into the display panel unit 11 and the touch detection panel unit 12 to facilitate understanding. In the implementation state, the touch detection panel unit 12 is arranged on a front side, the display panel unit 11 is arranged on a back side, and the touch detection panel unit 12 and the display panel unit 11 are integrated. FIG. 5A illustrates an implementation configuration example of the display panel unit 11, and FIG. 5B illustrates an implementation configuration example of the touch detection panel unit 12. Also, FIG. 5C illustrates flow of signals in an operation in the mutual detection method and an operation in the self-detection method.

The display panel unit 11 is a panel part on the TFT substrate side and is provided with the plurality of driving electrodes Tx1 to TxN. In the display panel unit 11, the driving electrode driving circuits 23-1 to 23-N provided in the touch driving unit 23 are arranged on the right and left sides in FIGS. 5A and 5C in a peripheral region of a region where the plurality of driving electrodes Tx1 to TxN are arranged, and a display control IC 201 is arranged on the lower side in FIGS. 5A and 5C. The display control IC 201 is implemented on a glass substrate constituting the display panel unit 11. In the display control IC 201, a circuit part of the display control unit 20 included in the liquid crystal display device with a touch detection function 1 illustrated in FIG. 1 is formed, for example. The display control unit 20 includes a circuit parts such as, as well as the control unit 21, the driving unit 22 including the touch driving unit 23, and the like.

A flexible printed circuit board 203 is connected to the display panel unit 11. A touch control IC 202 is built in the flexible printed circuit board 203. In the touch control IC 202, a circuit part of the touch control unit 30 included in the liquid crystal display device with a touch detection function 1 illustrated in FIG. 1 is formed, for example. The touch control unit 30 includes a circuit part such as the touch detection unit 31, the calculation unit 32, and the like.

As for the flexible printed circuit board 203, one terminal thereof is connected to the display control IC 201 on the side of the display panel unit 11, and the other terminal thereof is connected to the plurality of detection electrodes Rx1 to RxN on the side of the touch detection panel unit 12.

In the display panel unit 11, the plurality of driving electrodes Tx1 to TxN are connected to the touch driving unit 23 in the display control unit 20 formed in the display control IC 201 via the driving electrode driving circuits 23-1 to 23-N.

The touch detection panel unit 12 is a panel part on the color filter substrate side and is provided with the plurality of detection electrodes Rx1 to RxN. In the touch detection panel unit 12, the plurality of detection electrodes Rx1 to RxN are connected to the terminal of the flexible printed circuit board 203 on the lower side of a peripheral region of a region where the plurality of detection electrodes Rx1 to RxN are arranged.

In the module on which the liquid crystal display device with a touch detection function 1 is implemented, the display control IC 201 and the touch control IC 202 are connected via the flexible printed circuit board 203, and a plurality of signals are transmitted and received between the display control IC 201 and the touch control IC 202. In this module, synchronous control is performed between the display control IC 201 and the touch control IC 202.

As illustrated in FIG. 5C, between the display control IC 201 and the touch control IC 202, a driving signal EXVCOM is supplied from the touch control IC 202 to the display control IC 201, for example. In the display control IC 201, the driving signal EXVCOM is subject to a level shift to generate the mutual detection driving signal TSVCOM, and this mutual detection driving signal TSVCOM is supplied to the driving electrode driving circuits 23-1 to 23-N adapted to drive the driving electrodes Tx1 to TxN. The self-detection driving signal Guard is supplied from the touch control IC 202 to the driving electrode driving circuits 23-1 to 23-N adapted to drive the driving electrodes Tx1 to TxN. The detection signal Self-Sensing having an amplitude and a phase equal to those of the self-detection driving signal Guard is supplied from the touch control IC 202 to the detection electrodes Rx1 to RxN.

As illustrated in FIGS. 5A to 5C, in the configuration in which the driving electrode driving circuits 23-1 to 23-N are arranged on the right and left sides in the peripheral region of the region where the plurality of driving electrodes Tx1 to TxN are arranged, the same signal and voltage are applied to each of the driving electrodes Tx1 to TxN.

Note that, as well as the configuration in which the driving electrodes Tx1 to TxN are driven from both of the right and left sides, a configuration in which the driving electrodes Tx1 to TxN are driven only from either one of the right and left sides is also available. For example, the configuration in which the driving electrodes Tx1 to TxN are driven from both the right and left sides is advantageous in that touch driving time and the touch detection period can be made shorter than those in the configuration in which the driving electrodes Tx1 to TxN are driven from either one of the right and left sides. The reason for this is that signals input from left ends of the driving electrodes Tx1 to TxN are used for touch detection in a region on the left side relative to the center of the screen region and signals input from right ends of the driving electrodes Tx1 to TxN are used for touch detection in a region on the right side relative to the center of the screen region. Also, the configuration in which the driving electrodes Tx1 to TxN are driven from either one of the right and left sides is advantageous in that the implementation configuration of the circuit part and the like can be simplified further than that in the configuration in which the driving electrodes Tx1 to TxN are driven from both of the right and left sides.

<Operations in Mutual Detection Method and in Self-Detection Method>

Figure 6A:
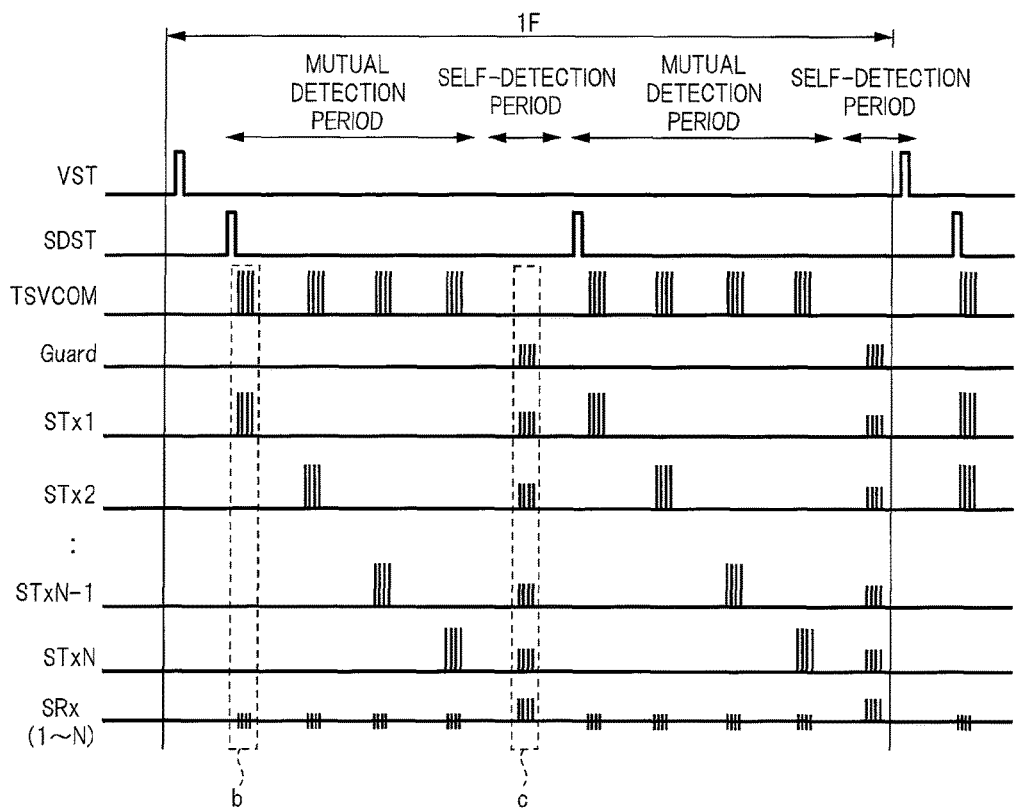
FIG. 6A is a timing chart illustrating operations of the mutual detection method and the self-detection method in the liquid crystal display device with a touch detection function according to the embodiment.
Figure 6B:
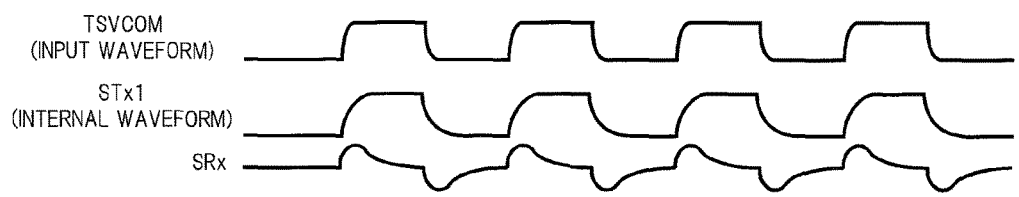
FIG. 6B is a timing chart illustrating operations of the mutual detection method and the self-detection method in the liquid crystal display device with a touch detection function according to the embodiment.
Figure 6C:
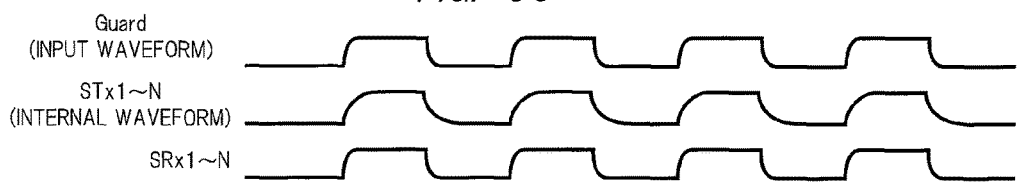
FIG. 6C is a timing chart illustrating operations of the mutual detection method and the self-detection method in the liquid crystal display device with a touch detection function according to the embodiment.

FIGS. 6A to 6C are timing charts illustrating operations in the mutual detection method and in the self-detection method. FIG. 6A illustrates detection periods in respective operation modes of the mutual detection method and the self-detection method, FIG. 6B is an enlarged view of the part b in FIG. 6A, and FIG. 6C is an enlarged view of the part c in FIG. 6A.

In FIGS. 6A to 6C, VST is a display start pulse, SDST is a detection start pulse of the mutual detection method and the self-detection method, TSVCOM is a driving signal in the mutual detection method, Guard is a driving signal in the self-detection method, STx1 to STxN are driving signals to be applied to the driving electrodes Tx1 to TxN, and SRx1 to SRxN are detection signals to be detected in the detection electrodes Rx1 to RxN.

Each of the mutual detection driving signal TSVCOM and the self-detection driving signal Guard is composed of a plurality of pulse trains in a pulse form in which voltage periodically changes to a high level as illustrated in FIGS. 6B and 6C. For example, the mutual detection driving signal TSVCOM is a pulse train of 0 to 5.5 V, and the self-detection driving signal Guard is a pulse train of 0 to 3.3 V.

In FIGS. 6A to 6C, one cycle of the display start pulse VST is one frame (IF) period. The frame period is a period having a predetermined length for displaying a frame image corresponding to the liquid crystal display. FIG. 6A illustrates a case where the detection start pulse SDST of the mutual detection method and the self-detection method is generated twice in one frame period. In this case, the display start pulse VST is set to 60 Hz, and the detection start pulse SDST is set to 120 Hz, for example.

Note that the number of times of generation of the detection start pulse SDST of the mutual detection method and the self-detection method per frame period of the display start pulse VST is not limited to this. For example, the detection start pulse SDST of the mutual detection method and the self-detection method can be generated once or three or more times per frame period of the display start pulse VST.

Each cycle period of the detection start pulse SDST of the mutual detection method and the self-detection method has one mutual detection period in the operation mode of the mutual detection method and one self-detection period in the operation mode of the self-detection method.

In the mutual detection period, the mutual detection driving signals TSVCOM are sequentially applied to the driving electrodes Tx1 to TxN as the driving signals STx1 to STxN, respectively, while all of the driving electrodes Tx1 to TxN are sequentially scanned. At this time, ground voltage is applied to each of the detection electrodes Rx1 to RxN. Then, detection signals are output from the respective detection electrodes Rx1 to RxN intersecting with the respective driving electrodes Tx1 to TxN. Each of the detection signals is output through the touch detection unit 31 and the calculation unit 32 in the touch control unit 30 as coordinate information of a touched position. In this manner, by supplying the mutual detection driving signal TSVCOM only to the driving electrode sequentially scanned, touch detection can be performed only about a position of a detection electrode intersecting with an arbitrary driving electrode.

In the self-detection period, the self-detection driving signals Guard are simultaneously applied to all of the driving electrodes Tx1 to TxN as the driving signals STx1 to STxN. At this time, the detection signal Self-Sensing having an amplitude and a phase equal to those of the self-detection driving signal Guard is applied to each of the detection electrodes Rx1 to RxN. Then, detection signals are output from the respective detection electrodes Rx1 to RxN intersecting with the respective driving electrodes Tx1 to TxN. Each of the detection signals is output through the touch detection unit 31 and the calculation unit 32 in the touch control unit 30 as information for determination of whether or not the external object approaches the detection electrodes. In this manner, by supplying the self-detection driving signals Guard to all of the driving electrodes, approach detection can be performed about all of the detection electrodes intersecting with all of the driving electrodes.

In the mutual detection period and the self-detection period illustrated in FIG. 6A, a period in which the plurality of pulse trains of the mutual detection driving signal TSVCOM and the self-detection driving signal Guard are not applied is a display period in which an image is displayed on the panel unit 10. In this display period, the gate lines are sequentially scanned in the gate line driving unit 40, and image signals are applied to the signal lines from the signal line driving unit 50, so that an image corresponding to the image signals are displayed on the panel unit 10.

<Driving Electrode Driving Circuit>

Figure 7:
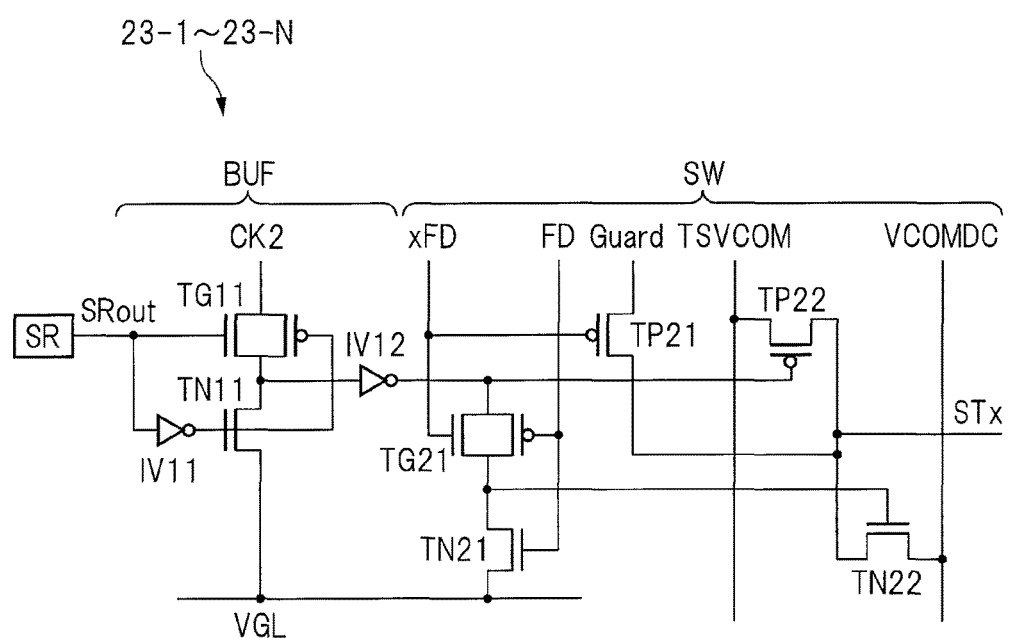
FIG. 7 is a circuit diagram illustrating an example of driving electrode driving circuits in the liquid crystal display device with a touch detection function according to the embodiment.

FIG. 7 is a circuit diagram illustrating an example of the driving electrode driving circuits 23-1 to 23-N. In order for the driving electrode driving circuits 23-1 to 23-N to input signals of the same waveforms to all of the driving electrodes Tx1 to TxN and to operate the driving electrodes Tx1 to TxN simultaneously in the operation mode of the self-detection method, a logic circuit operated by the self-detection driving signal Guard, a self-detection control signal FD, and an inversion signal xFD thereof is added.

The number of the driving electrode driving circuits is N from 23-1 to 23-N to correspond to the number of the driving electrodes Tx1 to TxN. Each of the driving electrode driving circuits 23-1 to 23-N is configured to include a shift register SR, a buffer circuit BUF connected to the shift register SR, and a switch circuit SW connected to the buffer circuit BUF. Each set of the shift register SR, the buffer circuit BUF, and the switch circuit SW corresponds to each of the driving electrodes Tx1 to TxN on a one-to-one basis.

Each buffer circuit BUF includes one CMOS transfer gate TG11, one NMOS transistor TN11, and two inverters IV11 and IV12. The CMOS transfer gate TG11 and the NMOS transistor TN11 function as switches. Source terminals and drain terminals of a PMOS transistor and an NMOS transistor are respectively connected to constitute the CMOS transfer gate TG11. A node in which the source terminals of the PMOS transistor and the NMOS transistor are connected is an input terminal of the CMOS transfer gate TG11. A node in which the drain terminals of the PMOS transistor and the NMOS transistor are connected is an output terminal of the CMOS transfer gate TG11.

An enable clock signal CK2 is input to the input terminal of the CMOS transfer gate TG11. The output terminal of the CMOS transfer gate TG11 is connected to a drain terminal of the NMOS transistor TN11. A source terminal of the NMOS transistor TN11 is connected to a voltage line VGL.

In the CMOS transfer gate TG11, an output signal SRout from the shift register SR is input to a gate terminal of the NMOS transistor, and an inversion signal obtained by inverting in the inverter IV11 the output signal SRout from the shift register SR is input to a gate terminal of the PMOS transistor. The CMOS transfer gate TG11 is gate-controlled by means of the output signal SRout from the shift register SR and the inversion signal obtained by inverting the output signal SRout in the inverter IV11. The inversion signal obtained by inverting in the inverter IV11 the output signal SRout from the shift register SR is input to a gate terminal of the NMOS transistor TN11, and the NMOS transistor TN11 is gate-controlled by means of the inversion signal.

A connection node between the output terminal of the CMOS transfer gate TG11 and the drain terminal of the NMOS transistor TN11 is connected to the inverter IV12. An output of each buffer circuit BUF is output to each switch circuit SW via this inverter IV12.

In each buffer circuit BUF, the output signal SRout from each shift register SR is temporarily held.

Each switch circuit SW includes one CMOS transfer gate TG21, two PMOS transistors TP21 and TP22, and two NMOS transistors TN21 and TN22. The CMOS transfer gate TG21, the PMOS transistors TP21 and TP22, and the NMOS transistors TN21 and TN22 function as switches. Source terminals and drain terminals of a PMOS transistor and an NMOS transistor are respectively connected to constitute the CMOS transfer gate TG21 in a similar manner to the CMOS transfer gate TG11.

The output signal from the inverter IV12 of the buffer circuit BUF is input to an input terminal of the CMOS transfer gate TG21. An output terminal of the CMOS transfer gate TG21 is connected to a drain terminal of the NMOS transistor TN21. A source terminal of the NMOS transistor TN21 is connected to the voltage line VGL.

In the CMOS transfer gate TG21, the self-detection control signal FD is input to a gate terminal of the PMOS transistor thereof, and an inversion signal xFD obtained by inverting the self-detection control signal FD is input to a gate terminal of the NMOS transistor thereof. The CMOS transfer gate TG21 is gate-controlled by means of the self-detection control signal FD and the inversion signal xFD obtained by inverting the self-detection control signal FD. In the NMOS transistor TN21, the control signal FD is input to a gate terminal thereof, and the NMOS transistor TN21 is gate-controlled by means of the self-detection control signal FD.

In the PMOS transistor TP21, the self-detection driving signal Guard is input to a source terminal thereof, and the inversion signal xFD obtained by inverting the self-detection control signal FD is input to a gate terminal thereof. The PMOS transistor TP21 is gate-controlled by means of the inversion signal xFD. A drain terminal of the PMOS transistor TP21 is connected to a connection node between a drain terminal of the PMOS transistor TP22 and a drain terminal of the NMOS transistor TN22.

In the PMOS transistor TP22, the mutual detection driving signal TSVCOM is input to a source terminal thereof, and the output signal from the inverter IV12 of the buffer circuit BUF is input to a gate terminal thereof. The PMOS transistor TP22 is gate-controlled by means of the output signal. The drain terminal of the PMOS transistor TP22 is connected to the drain terminal of the NMOS transistor TN22. In the NMOS transistor TN22, a display driving signal VCOMDC is input to a source terminal thereof, and a gate terminal thereof is connected to the output terminal of the CMOS transfer gate TG21. The NMOS transistor TN22 is gate-controlled by means of an output signal from the output terminal.

From the connection node between the drain terminal of the PMOS transistor TP22 and the drain terminal of the NMOS transistor TN22, the driving signals STx (STx1 to STxN) driving the respective driving electrodes Tx (Tx1 to TxN) are output.

In each switch circuit SW, the self-detection driving signal Guard is selected based on the self-detection control signal FD and the inversion signal xFD thereof and is supplied to each driving electrode Tx. Also, the mutual detection driving signal TSVCOM or the display driving signal VCOMDC is selected based on the output signal SRout from the shift register SR and the enable clock signal CK2 and is supplied to each driving electrode Tx.

In the configuration of the driving electrode driving circuits each including the buffer circuit BUF and the switch circuit SW as above, the operation mode of the mutual detection method and the operation mode of the self-detection method are as follows.

In the operation mode of the mutual detection method, the self-detection control signal FD is in a low level, the inversion signal xFD thereof is in a high level, the CMOS transfer gate TG21 is turned on, and each of the NMOS transistor TN21 and the PMOS transistor TP21 is turned off.

In the buffer circuit BUF, the CMOS transfer gate TG11 is gate-controlled by the output signal SRout from the shift register SR and the inversion signal thereof. When the output signal SRout from the shift register SR is in a high level, the CMOS transfer gate TG11 is turned on. Also, when the output signal SRout from the shift register SR is in a low level, the CMOS transfer gate TG11 is turned off. When the CMOS transfer gate TG11 is in the on state, the enable clock signal CK2 input to the input terminal of the CMOS transfer gate TG11 is transmitted to the output terminal as it is, is inverted in the inverter IV12, and is output to the switch circuit SW.

In the switch circuit SW, the output signal from the buffer circuit BUF is received as an input. When this output signal is in a high level, the NMOS transistor TN22 is turned on through the on-state CMOS transfer gate TG21. When the output signal is in a low level, the PMOS transistor TP22 is turned on. When the PMOS transistor TP22 is in the on state, the mutual detection driving signal TSVCOM is supplied to each driving electrode Tx. When the NMOS transistor TN22 is in the on state, the display driving signal VCOMDC is supplied to each driving electrode Tx. In this manner, the operation mode of the mutual detection method can be achieved.

In the operation mode of the self-detection method, the self-detection control signal FD is in a high level, the inversion signal xFD thereof is in a low level, the CMOS transfer gate TG21 is turned off, and each of the NMOS transistor TN21 and the PMOS transistor TP21 is turned on.

In the switch circuit SW, the CMOS transfer gate TG21 is gate-controlled by the self-detection control signal FD and the inversion signal xFD thereof, regardless of the output signal SRout from the shift register SR. When the self-detection control signal FD is in a high level and the inversion signal xFD thereof is in a low level, the CMOS transfer gate TG21 is turned off, and the PMOS transistor TP21 and the NMOS transistor TN21 are turned on. When the PMOS transistor TP21 is in the on state, the self-detection driving signal Guard input to the source terminal of the PMOS transistor TP21 is supplied to each driving electrode Tx. At this time, the PMOS transistor TP22 and the NMOS transistor TN22, whose gate terminals are connected to the input terminal and the output terminal of the CMOS transfer gate TG21, respectively, are in off states. In this manner, the operation mode of the self-detection method can be achieved.

<Capacitance Load>

Figure 8:
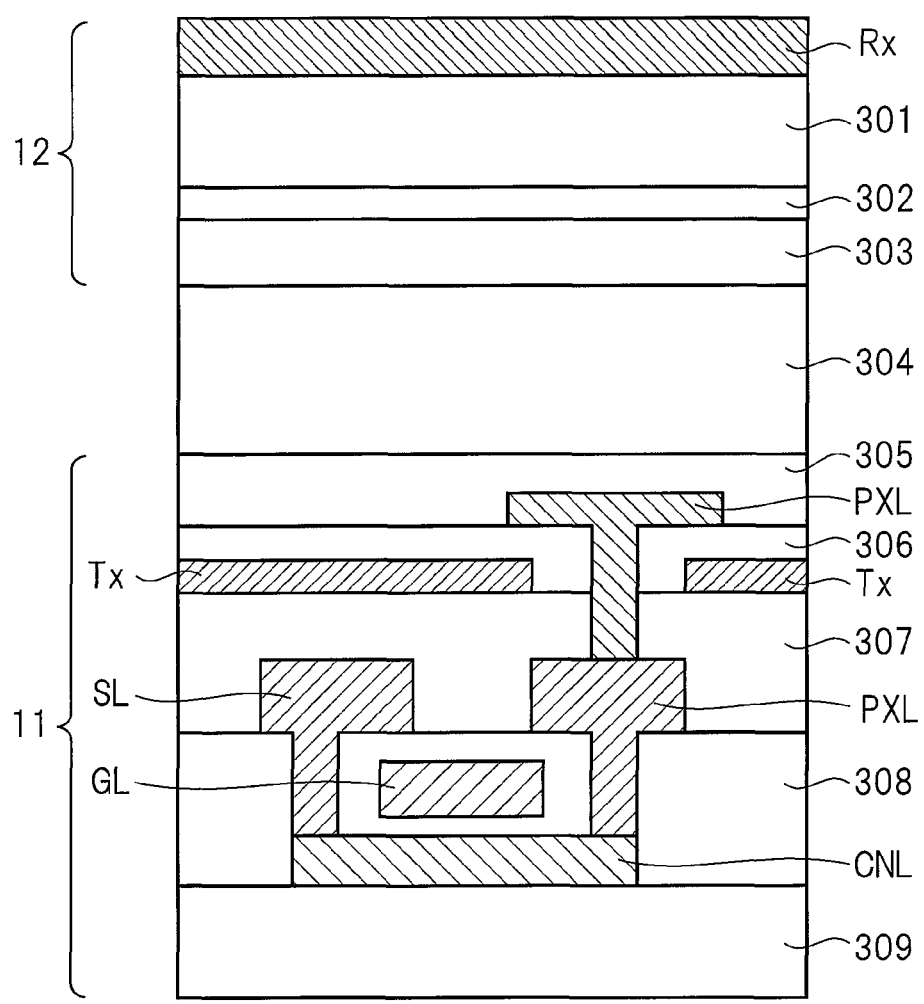
FIG. 8 is a cross-sectional view illustrating an example of an electrode structure of a panel unit in the liquid crystal display device with a touch detection function according to the embodiment.
Figure 9:
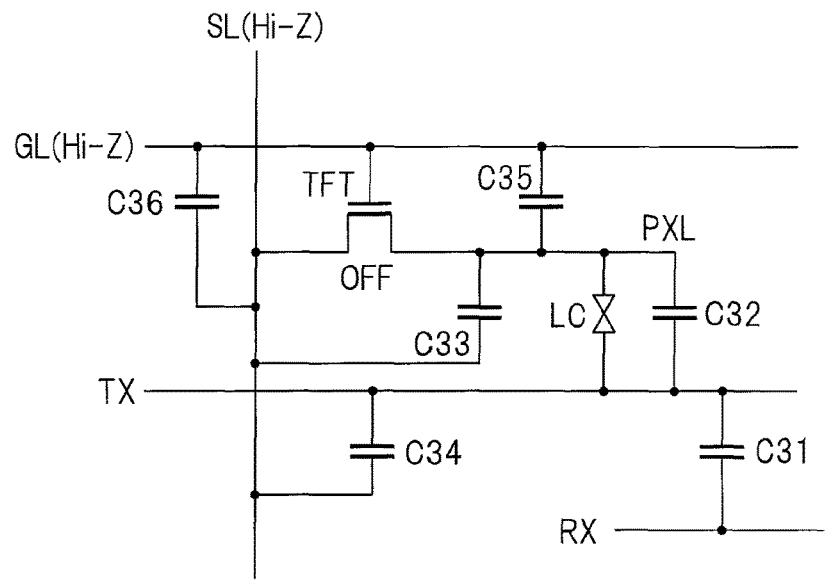
FIG. 9 is a circuit diagram illustrating an example of an equivalent circuit in the electrode structure of the panel unit illustrated in FIG. 8.

FIGS. 8 and 9 illustrate reduction of capacitance load between the driving electrode Tx and the detection electrode Rx and capacitance load between the driving electrode Tx and a thin film transistor TFT. FIG. 8 is a cross-sectional view illustrating an example of an electrode structure of the panel unit 10, and FIG. 9 is a circuit diagram illustrating an example of an equivalent circuit in the electrode structure of the panel unit 10 illustrated in FIG. 8. Hereinbelow, the thin film transistor will be referred to simply as the TFT as well.

FIG. 8 illustrates a glass substrate 301, a red, green, and blue color filter 302, an overcoat film 303, a liquid crystal layer 304, an oriented film 305, a dielectric layer 306, an insulating layer 307, a TFT layer 308, and a glass substrate 309. FIG. 8 also illustrates the detection electrode Rx, the driving electrode Tx, a pixel electrode PXL, the signal line SL, the gate line GL, and a TFT channel CNL. In FIG. 8, the upper side is a front side of the panel unit 10, and the touch position detection and the approach detection are performed on this front side. In FIG. 8, the lower side is a back side of the panel unit 10.

A part including the detection electrode Rx, the glass substrate 301, the red, green, and blue color filter 302, and the overcoat film 303 corresponds to the touch detection panel unit 12. In this touch detection panel unit 12, the detection electrode Rx is provided on a surface of the glass substrate 301 on the front side. On a surface of the glass substrate 301 on the side of the liquid crystal layer 304, the red, green, and blue color filter 302 and the overcoat film 303 are provided in this order in a direction from the glass substrate 301 to the liquid crystal layer 304.

A part including the oriented film 305, the dielectric layer 306, the driving electrode Tx, the insulating layer 307, the TFT layer 308, and the glass substrate 309 corresponds to the display panel unit 11. In this display panel unit 11, on a surface of the glass substrate 309 on the side of the liquid crystal layer 304, the TFT layer 308, the insulating layer 307, the driving electrode Tx, the dielectric layer 306, and the oriented film 305 are provided in this order in a direction from the glass substrate 309 to the liquid crystal layer 304. In the TFT layer 308, the TFT channel CNL, the gate line GL, and the signal line SL are provided. On a surface of the dielectric layer 306 on the side of the liquid crystal layer 304, the pixel electrode PXL connected to a drain electrode of the TFT is provided.

As illustrated in FIG. 8, the panel unit 10 has a structure in which the liquid crystal layer 304 is interposed between the display panel unit 11 and the touch detection panel unit 12. The display panel unit 11 is provided with the plurality of driving electrodes Tx for application of driving signals. The touch detection panel unit 12 is provided with the plurality of detection electrodes Rx intersecting with the respective driving electrodes Tx for detection of the signals. As described above with reference to FIG. 2 and the like, the plurality of driving electrodes Tx extend along the row direction and are arranged in parallel in the column direction, and the plurality of detection electrodes Rx extend along the column direction and are arranged in parallel in the row direction. Also, the gate lines GL connected to gate electrodes of the TFTs extend along the row direction and are arranged in parallel in the column direction in a similar manner to the driving electrodes Tx, and the signal lines SL connected to source electrodes of the TFTs extend along the column direction and are arranged in parallel in the row direction in a similar manner to the detection electrodes Rx.

That is, the panel unit 10 includes a plurality of (N×N) liquid crystal display elements arranged in a matrix form each including the TFT and a liquid crystal element LC, the plurality of (N) gate lines GL arranged to extend in the row direction, the plurality of (N) signal lines SL arranged to extend in the column direction, the plurality of (N) driving electrodes Tx arranged to extend in the row direction, and the plurality of (N) detection electrodes Rx arranged to extend in the column direction. In each TFT, the gate electrode thereof is connected to the gate line GL, the source electrode thereof is connected to the signal line SL, and the drain electrode thereof is connected to the liquid crystal element LC. The gate lines GL (GL1 to GLN) are connected to the gate line driving unit 40 described above with reference to FIG. 1 and are scanned by this gate line driving unit 40. The signal lines SL (SL1 to SLN) are connected to the signal line driving unit 50 described above with reference to FIG. 1 and are provided with data signals by this signal line driving unit 50.

In such a structure of the panel unit 10, capacitance C31 between the driving electrode Tx and the detection electrode Rx, capacitance C32 between the driving electrode Tx and the TFT, capacitance C33 between the signal line SL and the TFT, capacitance C34 between the signal line SL and the driving electrode Tx, capacitance C35 between the gate line GL and the TFT, and capacitance C36 between the signal line SL and the gate line GL are respectively generated as illustrated in FIG. 9. Such capacitance load needs to be reduced to reduce noise.

In the operation mode of the self-detection method, the capacitance C31 between the driving electrode Tx and the detection electrode Rx can be regarded as zero by supplying the driving signal Guard to all of the driving electrodes Tx and supplying the detection signal Self-Sensing having an amplitude and a phase equal to those of the driving signal Guard to all of the detection electrodes Rx. The capacitance C32 between the driving electrode Tx and the TFT can be ignored since, when the TFT is turned off, the TFT is in a floating state.

The capacitance C33 between the signal line SL and the TFT, the capacitance C34 between the signal line SL and the driving electrode Tx, the capacitance C35 between the gate line GL and the TFT, and the capacitance C36 between the signal line SL and the gate line GL are reduced by bringing both the signal line SL and the gate line GL to floating states. As for the capacitance C33 or C34 to the signal line SL, when either one is brought to a floating state, load remains as series capacitance between the adjacent signal line and the other capacitance. As for the capacitance C35 or C36 to the gate line GL, when either one is brought to a floating state, load remains as series capacitance between the adjacent gate line and the other capacitance. Under such circumstances, the signal line SL is first brought to a floating state by turning off a selection switch for selecting each signal line SL. This selection switch for selecting each signal line SL is provided in the signal line driving unit 50 illustrated in FIG. 1. The gate line GL is then brought to a floating state by using the self-detection control signal FD that has been used for each of the driving electrode driving circuits 23-1 to 23-N in a gate line driving circuit 41 as will be illustrated below in FIG. 10.

<Gate Line Driving Circuit>

Figure 10:
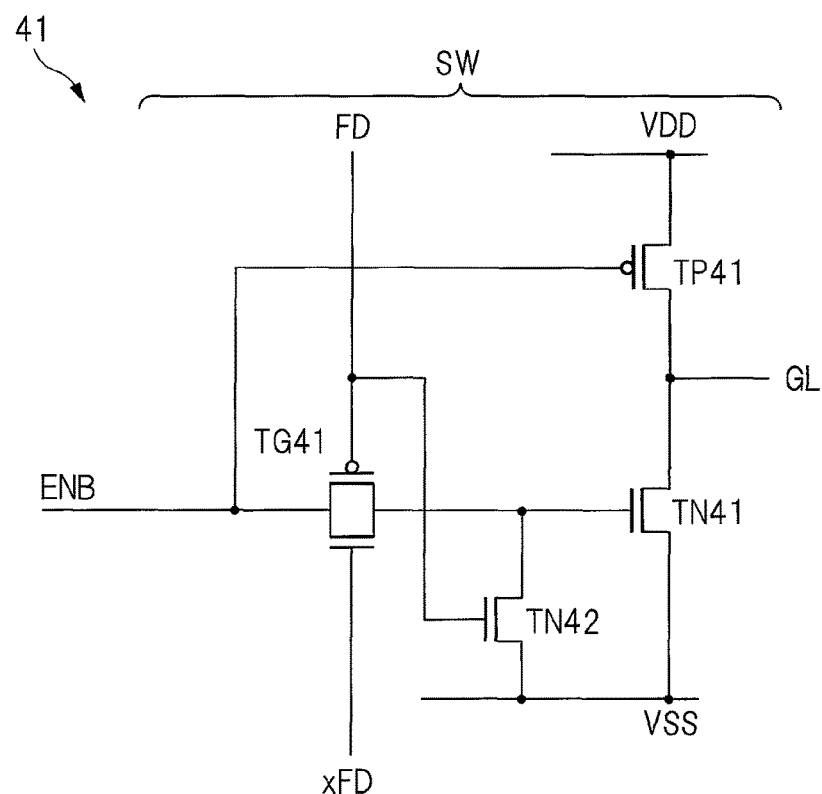
FIG. 10 is a circuit diagram illustrating an example of a gate line driving circuit in the liquid crystal display device with a touch detection function according to the embodiment.

FIG. 10 is a circuit diagram illustrating an example of the gate line driving circuit 41. In this gate line driving circuit 41, to reduce capacitance between the driving electrode Tx and the TFT in the operation mode of the self-detection method, the gate line GL is brought to a floating state by using the self-detection control signal FD and the inversion signal xFD. This gate line driving circuit 41 is provided in the gate line driving unit 40 illustrated in FIG. 1.

The number of the gate line driving circuits 41 is N corresponding to the number of the gate lines GL1 to GLN. In each of the gate line driving circuit 41, a switch circuit SW includes one CMOS transfer gate TG41, one PMOS transistor TP41, and two NMOS transistors TN41 and TN42. The CMOS transfer gate TG41, the PMOS transistor TP41, and the NMOS transistors TN41 and TN42 function as switches. Source terminals and drain terminals of a PMOS transistor and an NMOS transistor are respectively connected to constitute the CMOS transfer gate TG41.

An enable signal ENB is input to an input terminal of the CMOS transfer gate TG41. An output terminal of the CMOS transfer gate TG41 is connected to a drain terminal of the NMOS transistor TN42. A source terminal of the NMOS transistor TN42 is connected to a voltage line VSS.

In the CMOS transfer gate TG41, the self-detection control signal FD is input to a gate terminal of the PMOS transistor thereof, and the inversion signal xFD obtained by inverting the self-detection control signal FD is input to a gate terminal of the NMOS transistor thereof. The CMOS transfer gate TG41 is gate-controlled by means of the self-detection control signal FD and the inversion signal xFD thereof. The self-detection control signal FD is input to a gate terminal of the NMOS transistor TN42, and the NMOS transistor TN42 is gate-controlled by means of the self-detection control signal FD.

In the PMOS transistor TP41, a source terminal thereof is connected to a voltage line VDD, a drain terminal thereof is connected to a drain terminal of the NMOS transistor TN41, and the enable signal ENB is input to a gate terminal thereof. The PMOS transistor TP41 is gate-controlled by means of the enable signal ENB. In the NMOS transistor TN41, a source terminal thereof is connected to the voltage line VSS, the drain terminal thereof is connected to the drain terminal of the PMOS transistor TP41, and an output signal from the CMOS transfer gate TG41 is input to a gate terminal thereof. The NMOS transistor TN41 is gate-controlled by means of the output signal. From a connection node between the drain terminal of the PMOS transistor TP41 and the drain terminal of the NMOS transistor TN41, the gate signals driving the respective gate lines GL (GL1 to GLN) are output.

In the operation mode of the mutual detection method, the self-detection control signal FD is in a low level, the inversion signal xFD thereof is in a high level, the CMOS transfer gate TG41 is turned on, and the NMOS transistor TN42 is turned off.

Since the CMOS transfer gate TG41 is in the on state, the enable signal ENB input to the input terminal of the CMOS transfer gate TG41 is output to the output terminal as it is. The PMOS transistor TP41 and the NMOS transistor TN41 are gate-controlled by the enable signal ENB.

When the enable signal ENB is in a high level, the PMOS transistor TP41 is turned off, and the NMOS transistor TN41 is turned on. When the NMOS transistor TN41 is in the on state, voltage of the voltage line VSS connected to the source terminal of the NMOS transistor TN41 is supplied to the gate line GL.

When the enable signal ENB is in a low level, the PMOS transistor TP41 is turned on, and the NMOS transistor TN41 is turned off. When the PMOS transistor TP41 is in the on state, voltage of the voltage line VDD connected to the source terminal of the PMOS transistor TP41 is supplied to the gate line GL.

In this manner, in the operation mode of the mutual detection method, when either the NMOS transistor TN41 or the PMOS transistor TP41 is turned on, voltage of either the voltage line VSS or the voltage line VDD can be supplied to the gate line GL.

In the operation mode of the self-detection method, the self-detection control signal FD is in a high level, the inversion signal xFD thereof is in a low level, the CMOS transfer gate TG41 is turned off, and the NMOS transistor TN42 is turned on.

When the NMOS transistor TN42 is in the on state, the drain terminal of the NMOS transistor TN42 is in a low level, and the NMOS transistor TN41, which is gate-controlled by this low-level signal, is turned off. At this time, since the enable signal ENB is in a high level, the PMOS transistor TP41 is also in an off state.

In this manner, in the operation mode of the self-detection method, when both the NMOS transistor TN41 and the PMOS transistor TP41 are turned off, the gate line GL can be brought to a floating state.

<Self-Detection Control Signal Generation Circuit>

Figure 11:
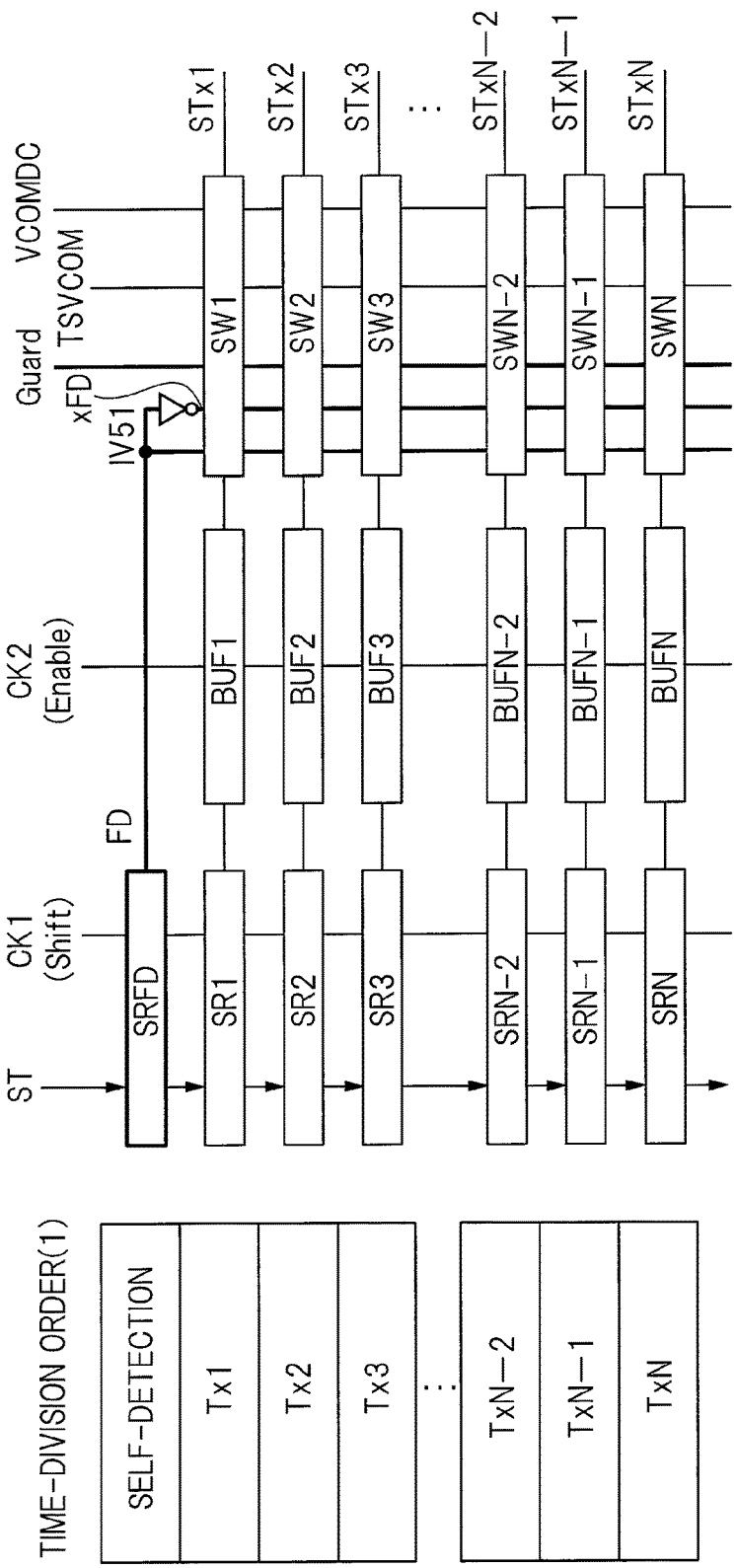
FIG. 11 illustrates an example of the driving electrode driving circuit including a self-detection control signal generation circuit in the liquid crystal display device with a touch detection function according to the embodiment.
Figure 12:
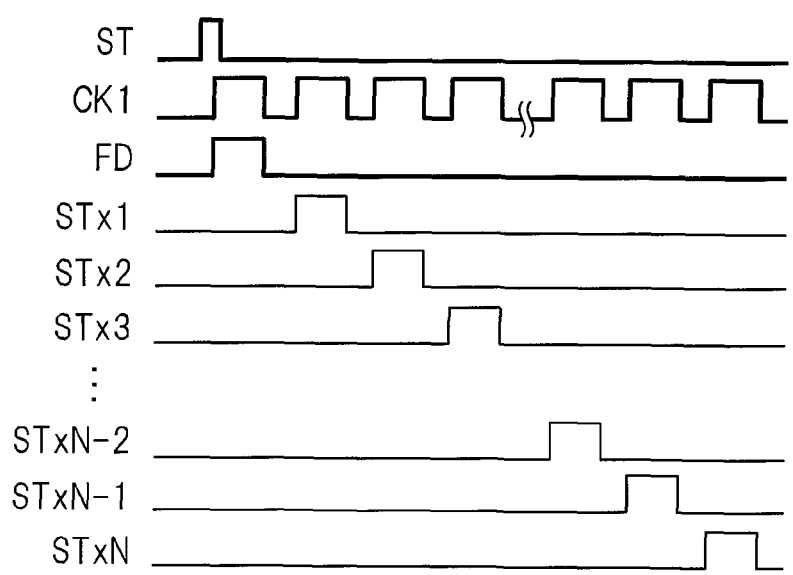
FIG. 12 is a timing chart illustrating an example of operations of the driving electrode driving circuit illustrated in FIG. 11.
Figure 13:
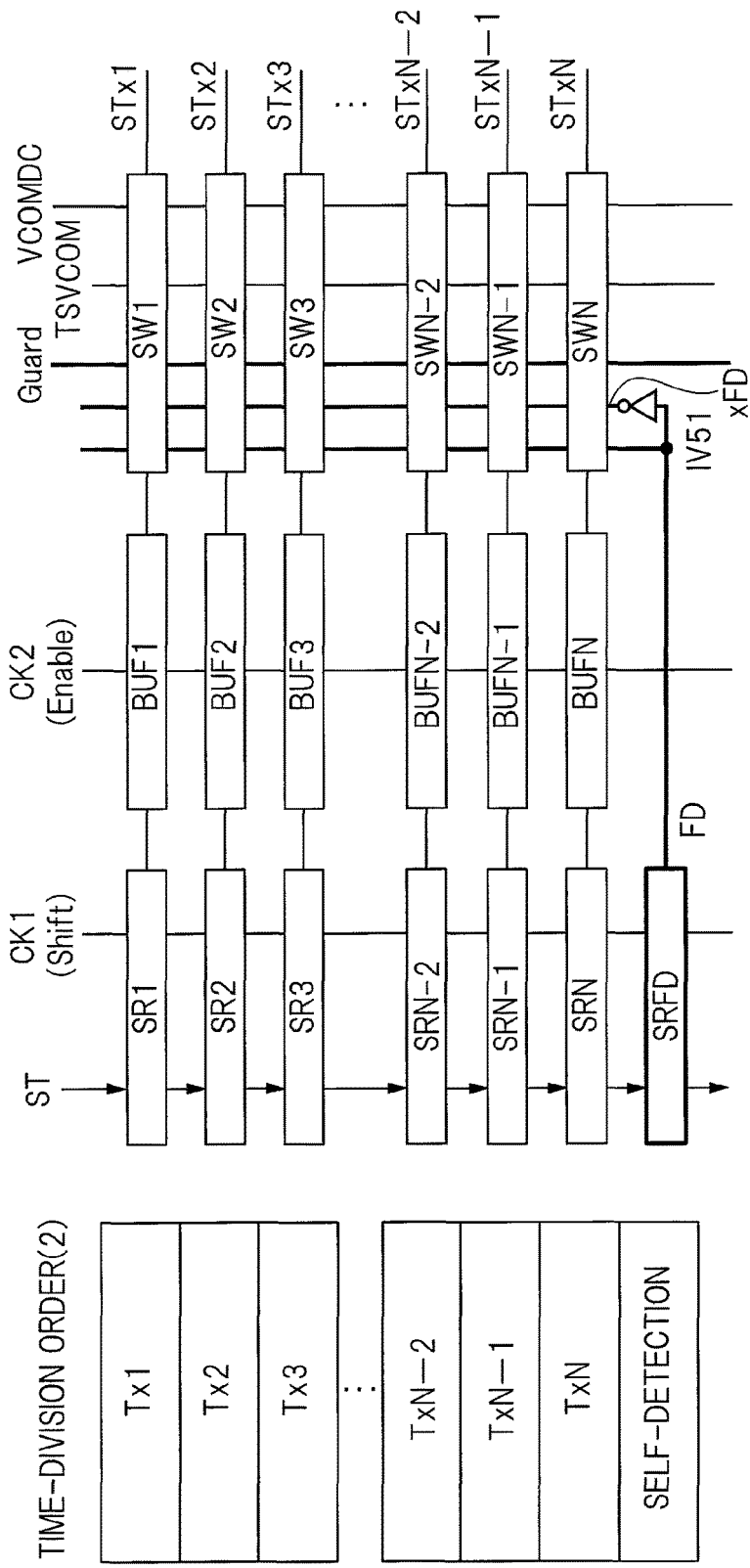
FIG. 13 illustrates another example of the driving electrode driving circuit including the self-detection control signal generation circuit in the liquid crystal display device with a touch detection function according to the embodiment.
Figure 14:
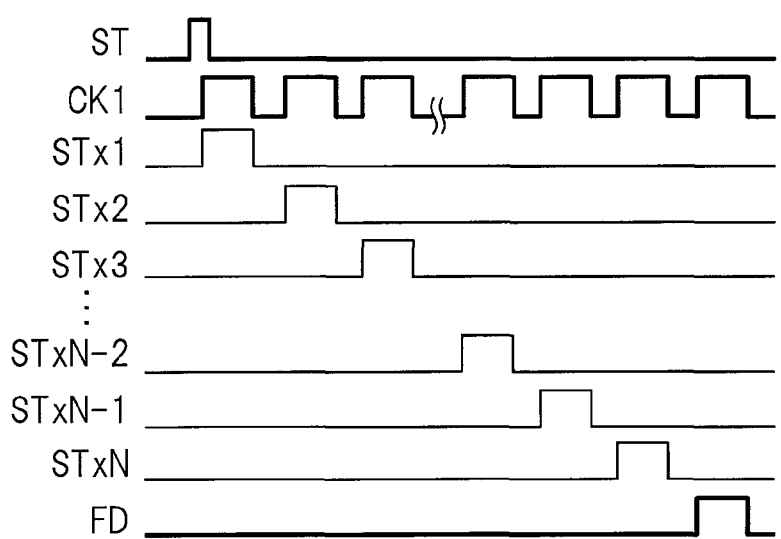
FIG. 14 is a timing chart illustrating another example of operations of the driving electrode driving circuit illustrated in FIG. 13.

FIGS. 11 to 14 illustrate a self-detection control signal generation circuit. Each of FIGS. 11 and 13 illustrates an example of the driving electrode driving circuits 23-1 to 23-N including the self-detection control signal generation circuit, and each of FIGS. 12 and 14 is a timing chart illustrating an example of operations of the driving electrode driving circuits 23-1 to 23-N using the self-detection control signal FD. FIGS. 11 and 12 illustrate an example of performing the operation mode of the self-detection method before performing the operation mode of the mutual detection method in a time-division order, and FIGS. 13 and 14 illustrate an example of performing the operation mode of the self-detection method after performing the operation mode of the mutual detection method in the time-division order.

As described above in FIG. 7, each of the driving electrode driving circuits 23-1 to 23-N is configured to include the shift register SR, the buffer circuit BUF connected to the shift register SR, and the switch circuit SW connected to the buffer circuit BUF. FIGS. 11 to 14 illustrate a configuration example of N (1 to N) driving electrode driving circuits 23-1 to 23-N. Thus, N shift registers SR1 to SRN, N buffer circuits BUF1 to BUFN, and N switch circuits SW1 to SWN are provided. Each set consisting of each of the shift registers SR1 to SRN, each of the buffer circuits BUF1 to BUFN, and each of the switch circuits SW1 to SWN corresponds to each of the driving electrodes Tx1 to TxN on a one-to-one basis.

The self-detection control signal FD is generated by adding one shift register SRFD to this configuration including the N shift registers. The self-detection control signal FD is generated in this added shift register SRFD. Also, the inversion signal xFD obtained by inverting the self-detection control signal FD is generated via an inverter IV51. Note that the self-detection control signal FD and the inversion signal xFD are not only generated in the driving electrode driving circuits 23-1 to 23-N but can also be supplied from an outside.

FIGS. 11 to 14 also illustrate a configuration in which the operation mode of the mutual detection method and the operation mode of the self-detection method are controlled in a time-division manner in the driving electrode driving circuits 23-1 to 23-N. To each of the shift registers SR1 to SRN, a start signal ST and a shift clock signal CK1 are supplied. To each of the buffer circuits BUF1 to BUFN, the enable clock signal CK2 is supplied. To each of the switch circuits SW1 to SWN, the self-detection control signal FD, the inversion signal xFD, the self-detection driving signal Guard, the mutual detection driving signal TSVCOM, and the display driving signal VCOMDC are supplied.

When the start signal ST is supplied to each of the shift registers SR1 to SRN, each of the shift registers SR1 to SRN sequentially shifts this start signal in synchronization with the shift clock signal CK1 and outputs the signal to each of the buffer circuits BUF1 to BUFN. An output signal from each of the shift registers SR1 to SRN is input to each of the buffer circuits BUF1 to BUFN, and each of the buffer circuits BUF1 to BUFN temporarily holds the output signal from each of the shift registers SR1 to SRN based on the enable clock signal CK2 and outputs the signal to each of the switch circuits SW1 to SWN. The detailed operations are as described above in FIG. 7. An output signal from each of the buffer circuits BUF1 to BUFN is input to each of the switch circuits SW1 to SWN, and each of the switch circuits SW1 to SWN selects the self-detection driving signal Guard, the mutual detection driving signal TSVCOM, or the display driving signal VCOMDC based on the self-detection control signal FD and the inversion signal xFD thereof and supplies the signal to each of the driving electrodes Tx1 to TxN. The detailed operations are as described above in FIG. 7.

In the time-division control of the operation mode of the mutual detection method and the operation mode of the self-detection method, the respective operation modes are performed in a time-division order. For example, a method for performing the operation mode of the self-detection method before performing the operation mode of the mutual detection method as illustrated in FIGS. 11 and 12 and a method for performing the operation mode of the self-detection method after performing the operation mode of the mutual detection method as illustrated in FIGS. 13 and 14 are provided.

The method for performing the operation mode of the self-detection method before performing the operation mode of the mutual detection method is performed based on the timing chart illustrated in FIG. 12. When the start signal ST is supplied, the self-detection control signal FD is first output in synchronization with a first clock signal of the shift clock signal CK1. Thereafter, the mutual detection driving signal TSVCOM to be applied to the driving electrode Tx1 is output as the driving signal STx1 in synchronization with a second clock signal. Subsequently, the mutual detection driving signals TSVCOM to be applied to the driving electrodes Tx2 to TxN are sequentially output as the driving signals STx2 to STxN in synchronization with the third to the (N+1)th clock signals.

The method for performing the operation mode of the self-detection method after performing the operation mode of the mutual detection method is performed based on the timing chart illustrated in FIG. 14. When the start signal ST is supplied, the mutual detection driving signal TSVCOM to be applied to the driving electrode Tx1 is first output as the driving signal STx1 in synchronization with a first clock signal of the shift clock signal CK1. Subsequently, the mutual detection driving signals TSVCOM to be applied to the driving electrodes Tx2 to TxN are sequentially output as the driving signals STx2 to STxN in synchronization with the second to the Nth clock signals. Thereafter, the self-detection control signal FD is output in synchronization with the (N+1)th clock signal.

Although a pulse width of the self-detection control signal FD and a pulse width of each of the driving signals STx1 to STxN for mutual detection to be applied to each of the driving electrodes Tx1 to TxN are equal in this example, the pulse widths can be different. For example, the pulse width of the self-detection control signal FD may be shorter than the pulse width of each of the driving signals STx1 to STxN for mutual detection to be applied to each of the driving electrodes Tx1 to TxN. In this case, by adjusting the pulse width of each shift clock signal CK1, the pulse width of the self-detection control signal FD can be shorter than the pulse width of each of the driving signals STx1 to STxN for mutual detection.

<Modification Example of Driving Electrode Driving Circuit>

Figure 15:
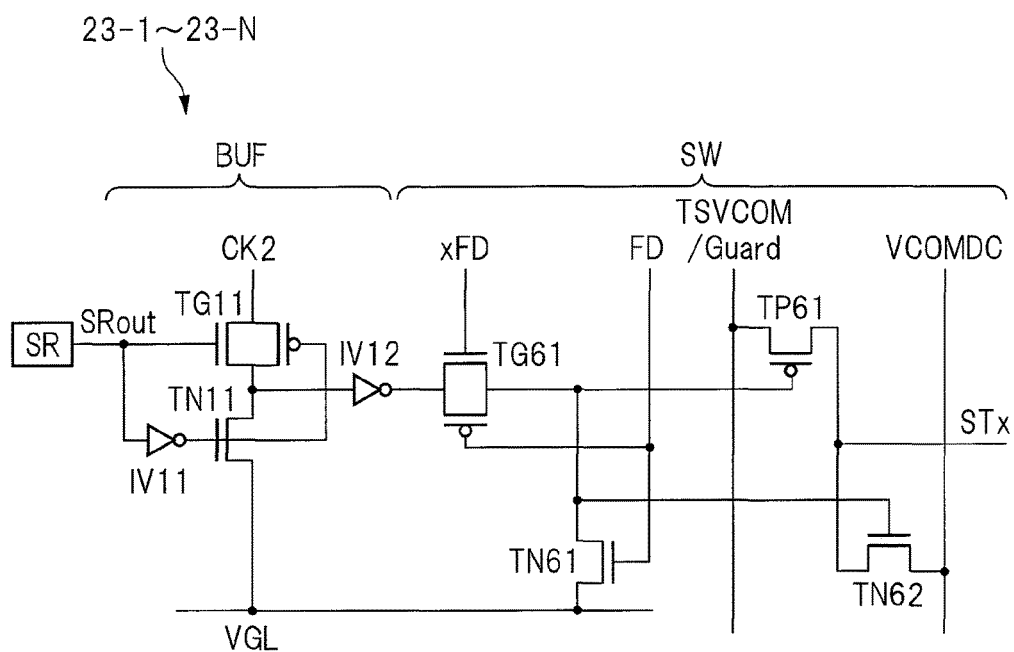
FIG. 15 is a circuit diagram illustrating a modification example of the driving electrode driving circuit in the liquid crystal display device with a touch detection function according to the embodiment.

FIG. 15 is a circuit diagram illustrating a modification example of the driving electrode driving circuit 23-1 to 23-N. The driving electrode driving circuit described above with reference to FIG. 7 requires a leading wire and the switch of the PMOS transistor for the self-detection driving signal Guard, which is disadvantageous to a narrow frame, for example. Conversely, each of the driving electrode driving circuits 23-1 to 23-N illustrated in FIG. 15 is an example applied to a configuration in which output can be selected from the mutual detection driving signal TSVCOM or the self-detection driving signal Guard in the display control IC 201 of the display control unit 20. In this configuration, each switch circuit SW in each of the driving electrode driving circuits 23-1 to 23-N can supply the mutual detection driving signal TSVCOM or the self-detection driving signal Guard previously selected and input based on the self-detection control signal FD and the inversion signal xFD thereof to each of the driving electrodes Tx.

In each of the driving electrode driving circuits 23-1 to 23-N illustrated in FIG. 15, the buffer circuit BUF is similar to one described above with reference to FIG. 7, and a configuration of the switch circuit SW is different. Here, different parts of the switch circuit SW will mainly be described.

Each switch circuit SW includes one CMOS transfer gate TG61, two NMOS transistors TN61 and TN62, and one PMOS transistor TP61. The CMOS transfer gate TG61, the NMOS transistors TN61 and TN62, and the PMOS transistor TP61 function as switches.

The output signal from the inverter IV12 of the buffer circuit BUF is input to an input terminal of the CMOS transfer gate TG61. An output terminal of the CMOS transfer gate TG61 is connected to a drain terminal of the NMOS transistor TN61. A source terminal of the NMOS transistor TN61 is connected to the voltage line VGL.

In the CMOS transfer gate TG61, the self-detection control signal FD is input to a gate terminal of a PMOS transistor thereof, and the inversion signal xFD obtained by inverting the self-detection control signal FD is input to a gate terminal of an NMOS transistor thereof. The CMOS transfer gate TG61 is gate-controlled by means of the self-detection control signal FD and the inversion signal xFD obtained by inverting the self-detection control signal FD. In the NMOS transistor TN61, the self-detection control signal FD is input to a gate terminal thereof, and the NMOS transistor TN61 is gate-controlled by means of the self-detection control signal FD.

In the PMOS transistor TP61, the mutual detection driving signal TSVCOM or the self-detection driving signal Guard is input to a source terminal thereof, and an output signal from the output terminal of the CMOS transfer gate TG61 is input to a gate terminal thereof. The PMOS transistor TP61 is gate-controlled by means of the output signal. A drain terminal of the PMOS transistor TP61 is connected to a drain terminal of the NMOS transistor TN62. In the NMOS transistor TN62, the display driving signal VCOMDC is input to a source terminal thereof, and a gate terminal thereof is connected to the output terminal of the CMOS transfer gate TG61. The NMOS transistor TN62 is gate-controlled by means of an output signal from the output terminal.

From a connection node between the drain terminal of the PMOS transistor TP61 and the drain terminal of the NMOS transistor TN62, the driving signals STx driving the respective driving electrodes Tx are output.

In each switch circuit SW, the mutual detection driving signal TSVCOM or the self-detection driving signal Guard previously selected and input based on the self-detection control signal FD and the inversion signal xFD thereof is supplied to each driving electrode Tx.

In the configuration of the driving electrode driving circuits each including the buffer circuit BUF and the switch circuit SW illustrated in FIG. 15, the operation mode of the mutual detection method and the operation mode of the self-detection method are as follows.

In the operation mode of the mutual detection method, the self-detection control signal FD is in a low level, the inversion signal xFD thereof is in a high level, the CMOS transfer gate TG61 is turned on, and the NMOS transistor TN61 is turned off.

In the switch circuit SW, the output signal from the buffer circuit BUF is received as an input. This output signal is output as it is through the on-state CMOS transfer gate TG61. When the output signal from the buffer circuit BUF is in a high level, the NMOS transistor TN62 is turned on. When the output signal is in a low level, the PMOS transistor TP61 is turned on. When the PMOS transistor TP61 is in the on state, the mutual detection driving signal TSVCOM previously selected and input is supplied to each driving electrode Tx. When the NMOS transistor TN62 is in the on state, the display driving signal VCOMDC is supplied to each driving electrode Tx. In this manner, the operation mode of the mutual detection method can be achieved.

In the operation mode of the self-detection method, the self-detection control signal FD is in a high level, the inversion signal xFD thereof is in a low level, the CMOS transfer gate TG61 is turned off, and the NMOS transistor TN61 is turned on. At this time, the PMOS transistor TP61 is in an on state, and the NMOS transistor TN62 is in an off state through the on-state NMOS transistor TN61. When the PMOS transistor TP61 is in the on state, the self-detection driving signal Guard previously selected and input to the source terminal of the PMOS transistor TP61 is supplied to each driving electrode Tx. In this manner, the operation mode of the self-detection method can be achieved.

<Effect of Embodiment>

With the liquid crystal display device with a touch detection function 1 according to the present embodiment described above, the driving circuit for supporting the mutual detection method and the self-detection method can be achieved. Further details thereof are as follows.

(1) As operation modes employed by the driving unit 22 driving the panel unit 10, the operation mode of the mutual detection method and the operation mode of the self-detection method are provided. Thus, in the operation mode of the mutual detection method, the detection operation of the external object can be performed in units of the divided region 103 obtained by dividing the entire surface 102 of the touch region 101 of the panel unit 10. Also, in the operation mode of the self-detection method, the detection operation of the external object can be performed on the entire surface 102 of the touch region 101 of the panel unit 10. Consequently, the liquid crystal display device with a touch detection function 1 that can support the mutual detection method and the self-detection method based on changes in capacitance can be achieved.

(2) In the operation mode of the mutual detection method, the contact position of the external object with each divided region 103 can particularly be detected in units of the divided region 103 of the panel unit 10. Also, in particular, in the operation mode of the self-detection method, whether or not the external object approaches the entire surface 102 can be detected on the entire surface 102 of the panel unit 10. Consequently, the liquid crystal display device with a touch detection function 1 capable of detecting the contact position of the external object and whether or not the external object approaches based on changes of capacitance can be achieved.

(3) In the operation mode of the mutual detection method and the operation mode of the self-detection method, the external object to be detected in the operation mode of the self-detection method can be an equal object such as a finger of a user and a pen or a different object such as a mobile phone or a smartphone possessed by another person nearby. Consequently, in the operation mode of the mutual detection method and the operation mode of the self-detection method, the equal object or the different object can be a target for detection.

(4) In the operation mode of the mutual detection method and the operation mode of the self-detection method, the operation mode of the self-detection method can be performed in the time-division order before the operation mode of the mutual detection method is performed or after the operation mode of the mutual detection method is performed. Consequently, the time-division control can be performed by regarding the operation period of the self-detection method as a part of the operation period of the mutual detection method.

(5) The panel unit 10 includes the plurality of driving electrodes Tx1 to TxN to which driving signals are to be supplied and the plurality of detection electrodes Rx1 to RxN from which the detection signals are to be generated. In this configuration, by supplying the driving signals Guard and Self-Sensing which have an amplitude and a phase equal to each other and in which voltage periodically changes to each of the plurality of driving electrodes Tx1 to TxN and each of the plurality of detection electrodes Rx1 to RxN in the period in the operation mode of the self-detection method, capacitance load between each of the driving electrodes Tx1 to TxN and each of the detection electrodes Rx1 to RxN can be reduced. Also, even when all of the driving electrodes Tx1 to TxN are operated at the same time, the potential of the driving electrodes Tx1 to TxN is fixed so as for the driving electrodes Tx1 to TxN to function as noise shields, and noise reduction can thus be achieved.

(6) The driving unit 22 includes the driving electrode driving circuits 23-1 to 23-N supplying the driving signals to the plurality of driving electrodes Tx1 to TxN, respectively. The driving electrode driving circuits 23-1 to 23-N include the plurality of switch circuits SW1 to SWN each corresponding to the plurality of driving electrodes Tx1 to TxN and the shift register SRFD generating the self-detection control signal FD. Thus, the self-detection control signal FD and the inversion signal xFD thereof can be generated in the driving electrode driving circuits 23-1 to 23-N. Consequently, the degree of freedom of selecting the display control IC 201 controlling the driving electrode driving circuits 23-1 to 23-N can be improved.

(7) Each of the plurality of switch circuits SW1 to SWN in the driving electrode driving circuits 23-1 to 23-N selects the self-detection driving signal Guard or the mutual detection driving signal TSVCOM based on the self-detection control signal FD and the inversion signal xFD thereof and supplies the signal to each of the driving electrodes Tx1 to TxN. Consequently, the driving electrode driving circuits 23-1 to 23-N that can support the operation mode of the mutual detection method and the operation mode of the self-detection method can be achieved.

(8) Each of the plurality of the switch circuits SW1 to SWN in the driving electrode driving circuits 23-1 to 23-N supplies the self-detection driving signal Guard or the mutual detection driving signal TSVCOM previously selected and input based on the self-detection control signal FD and the inversion signal xFD thereof to each of the driving electrodes Tx1 to TxN. Consequently, the leading wire and the switch of the transistor for the self-detection driving signal Guard becomes unnecessary, and accordingly, the driving electrode driving circuits 23-1 to 23-N capable of supporting the operation mode of the mutual detection method and the operation mode of the self-detection method can be achieved. As a result, the leading wire is not required, thereby enabling the panel unit 10 to have a narrow frame. Also, the switch is not required, thereby achieving reduction in power consumption.

(9) In the operation mode of the mutual detection method and the operation mode of the self-detection method, the display period in which an image is displayed on the panel unit 10 is included. Each of the plurality of the switch circuits SW1 to SWN in the driving electrode driving circuits 23-1 to 23-N selects and supplies the display driving signal VCOMDC to each of the plurality of driving electrodes Tx1 to TxN in the display period. Consequently, the display period in which an image is displayed can be provided between a detection period and a detection period in the mutual detection method and the self-detection method.

(10) The panel unit 10 includes the plurality of liquid crystal display elements arranged in a matrix form and each including the thin film transistor TFT and the liquid crystal element LC, the plurality of gate lines GL1 to GLN supplying the scanning signals to the plurality of liquid crystal display elements, respectively, and the plurality of signal lines SL1 to SLN supplying the image signals to the plurality of liquid crystal display elements, respectively. Each of the plurality of gate lines GL1 to GLN and the plurality of signal lines SL1 to SLN is in a high impedance state in a period in the operation mode of the self-detection method. Consequently, by bringing the gate lines GL1 to GLN and the signal lines SL1 to SLN of the panel unit 10 to floating states, the capacitance load between the driving electrodes Tx1 to TxN and the thin film transistors TFT can be reduced.

(11) The gate line driving unit 40 includes the gate line driving circuit 41 supplying the scanning signals to the plurality of gate lines GL1 to GLN, respectively. The gate line driving circuit 41 includes the plurality of switch circuits SW corresponding to the plurality of gate lines GL1 to GLN, respectively. Each of the plurality of switch circuits SW brings the plurality of gate lines GL1 to GLN to high impedance states, respectively, based on the self-detection control signal FD and the inversion signal xFD thereof. Consequently, since the gate lines GL1 to GLN are brought to floating states to enable capacitance to the gate lines GL1 to GLN to be reduced, the capacitance load between the driving electrodes Tx1 to TxN and the thin film transistors TFT can be reduced.

(12) According to the above (1) to (11), by performing the time-division control by regarding the operation period in the self-detection method as apart of the operation period in the mutual detection method and fixing the potential of the driving electrodes Tx1 to TxN without charge and discharge capacitance between the driving electrodes Tx1 to TxN and the detection electrodes Rx1 to RxN, the liquid crystal display device with a touch detection function 1 capable of performing the operation of the self-detection method with high accuracy and in short time can be achieved. In the liquid crystal display device with a touch detection function 1, the operation mode of the mutual detection method and the operation mode of the self-detection method can be achieved by changing the driving electrode driving circuits 23-1 to 23-N and the gate line driving circuit 41 without the need for adding a novel structure to a structure capable of achieving the operation mode of the mutual detection method. Also, a result of detection of whether or not the external object approaches in the operation mode of the self-detection method and a result of detection of the contact position in the operation mode of the mutual detection method can be output simultaneously as a report.

Various modifications and alterations can be conceived by those skilled in the art within the spirit of the present invention, and it is understood that such modifications and alterations are also encompassed within the scope of the present invention. For example, those skilled in the art can suitably modify the above-described embodiment by addition, deletion, or design change of components, or by addition, omission, or condition change of steps. Such modifications are also encompassed within the scope of the present invention as long as they include the gist of the present invention.

Those apparent from the description of the specification or imagined easily by those skilled in the art about other advantageous effects generated by the configuration described in the embodiment are considered by being generated by the invention as a matter of course.

Although the liquid crystal display device with a touch detection function is mainly described in the present embodiment, the display panel is not limited to the liquid crystal display panel. For example, the display panel may be an organic EL panel in which organic EL elements are arranged in a matrix form. In this case, the driving electrodes can also be used as cathode electrodes of the organic EL panel. Also, note that, in the organic EL panel and a liquid crystal display panel having a memory function in each pixel, not only the gate lines and the signal lines but also other control lines such as reset lines and clock lines are used in some cases. The present invention can also be applied to such other control lines. In addition, the present invention can also be applied to a display device in which a touch detection function is provided in a different panel from a display panel, and in which the display panel and the touch detection panel are integrated.

What is claimed is:

1. A display device comprising:
    a panel unit which includes a TFT substrate having a plurality of driving electrodes, a color filter substrate having a plurality of detection electrodes, and a liquid crystal layer formed between the TFT substrate and the color filter substrate; and
    a driving unit driving the panel unit,
    wherein the driving unit includes as operation modes:
    a first mode in which a detection operation of an external object is performed in units of a divided region obtained by dividing a first touch region of the panel unit; and
    a second mode in which a detection operation of an external object is performed on an entire surface of the first touch region of the panel unit,
    wherein the first mode is a detecting mode, in units of the divided region of the first touch region, a contact position of the external object with each divided region,
    wherein the second mode is a detecting mode, on the entire surface of the first touch region, whether or not the external object approaches the entire surface without coordinate information of the external object,
    wherein driving signals for detection of the external object are supplied to the plurality of driving electrodes, and detection signals for detection of the external object are generated by the plurality of detection electrodes,
    wherein driving signals which have an amplitude and a phase equal to each other and in which voltage periodically changes are supplied to each of the plurality of driving electrodes and each of the plurality of detection electrodes in a period of the second mode,
    wherein the driving unit includes a driving electrode driving circuit supplying the driving signals to each of the plurality of driving electrodes, respectively,
    wherein the driving electrode driving circuit includes:
        a plurality of switch circuits each corresponding to the plurality of driving electrodes;
        a buffer circuit connected to one of the switch circuits; and
        a shift register connected to the buffer circuit and generating a control signal for the second mode,
    wherein each the switch circuit includes:
        a CMOS transfer gate;
        a first PMOS transistor;
        a second PMOS transistor;
        a first NMOS transistor; and
        a second NMOS transistor, and
    wherein an input terminal of the CMOS transfer gate is electrically connected to the buffer circuit, and an output terminal of the CMOS transfer gate is connected to a drain terminal of the first NMOS transistor.

2. The display device according to claim 1,
    wherein the first mode and the second mode are performed in a time-division order, and the second mode is performed before or after the first mode.

3. The display device according to claim 1,
    wherein each of the plurality of switch circuits in the driving electrode driving circuit selects a driving signal for the second mode or a driving signal for the first mode based on the control signal for the second mode and supplies the signal to each of the plurality of driving electrodes.

4. The display device according to claim 1,
    wherein each of the plurality of the switch circuits in the driving electrode driving circuit supplies a driving signal for the second mode or a driving signal for the first mode previously selected and input based on the control signal for the second mode to each of the plurality of the driving electrodes.

5. The display device according to claim 3,
    wherein, in the first mode and the second mode, a display period in which an image is displayed on the panel unit is included, and
    wherein each of the plurality of the switch circuits in the driving electrode driving circuit selects and supplies a driving signal for display to each of the plurality of driving electrodes in the display period.

6. The display device according to claim 1,
    wherein the TFT substrate includes:
    a plurality of display elements arranged in a matrix form;
    a plurality of gate lines supplying scanning signals to the plurality of display elements, respectively; and
    a plurality of signal lines supplying image signals to the plurality of display elements, respectively, and
    wherein each of the plurality of gate lines and the plurality of signal lines is in a high impedance state in the period of the second mode.

7. The display device according to claim 6,
    wherein the driving unit includes a gate line driving circuit supplying scanning signals to the plurality of gate lines, respectively,
    wherein the gate line driving circuit includes a plurality of switch circuits each corresponding to the plurality of gate lines, and
    wherein each of the plurality of switch circuits brings each of the plurality of gate lines to high impedance states, based on the control signal for the second mode.

8. The display device according to claim 4,
    wherein, in the first mode and the second mode, a display period in which an image is displayed on the panel unit is included, and
    wherein each of the plurality of the switch circuits in the driving electrode driving circuit selects and supplies a driving signal for display to each of the plurality of driving electrodes in the display period.

9. The display device according to claim 1,
    wherein a control signal of the second mode is input to a gate terminal of a PMOS transistor of the CMOS transfer gate and a gate of the first NMOS transistor, and
    wherein an inversion signal of the control signal of the second mode is input to a gate terminal of a NMOS transistor of the CMOS transfer gate and a gate terminal of the first PMOS transistor.

10. The display device according to claim 9,
    wherein the detection control signal is input to a source of the first PMOS transistor, and the drain of the first PMOS transistor is connected to the driving electrode in the second mode.

11. The display device according to claim 10,
    wherein a control signal for the first mode is input to a source of the second PMOS transistor, a gate of the second PMOS transistor is electrically connected to the buffer circuit, and a drain of the second PMOS transistor is connected to the driving electrode in the first mode.

12. The display device according to claim 11,
wherein the driving electrode driving circuit further includes as another operation mode, a display period in which an image is displayed on the panel unit,
wherein a display driving signal is input to a source of the second NMOS transistor, a gate of the second NMOS transistor is connected to the output terminal of the CMOS transfer gate, and a drain of the second NMOS transistor is connected to the driving electrode in the display period.

13. The display device according to claim 7,
wherein the switch circuit of the gate line driving circuit includes:
a CMOS transfer gate;
a PMOS transistor;
a first NMOS transistor; and
a second NMOS transistor,
wherein a control signal of the second mode is input to a gate of a PMOS transistor of the CMOS transfer gate and a gate of the second NMOS transistor, and an inversion signal of the control signal of the second mode is input to a gate of a NMOS transistor of the CMOS transfer gate, and
wherein an enable signal is input to an input terminal of the CMOS transfer gate, and an output terminal of the CMOS transfer gate is connected to a drain of the second NMOS transistor.

14. The display device according to claim 13,
wherein the enable signal is input to a gate of the PMOS transistor, a drain of the PMOS transistor is connected to the gate line, and a source of the PMOS transistor is connected to a first voltage line.

15. The display device according to claim 14,
wherein the output terminal of the CMOS transfer gate is connected to a gate of the first NMOS transistor, a second voltage line is connected to a source of the first and second NMOS transistors, and the drain of the first transistor is connected to the gate line.

* * * * *